(12) United States Patent
Masuda et al.

(10) Patent No.: US 7,238,801 B2
(45) Date of Patent: Jul. 3, 2007

(54) PHTHALOCYANINE COMPOUND, METHOD FOR PRODUCTION THEREOF, AND NEAR INFRARED ABSORBING DYE AND NEAR INFRARED ABSORBING FILTER USING SAME

(75) Inventors: Kiyoshi Masuda, Ushiku (JP); Masunori Kitao, Ushiku (JP)

(73) Assignee: Nippon Shokubai Co., Ltd., Osaka (JP)

( * ) Notice: Subject to any disclaimer, the term of this patent is extended or adjusted under 35 U.S.C. 154(b) by 411 days.

(21) Appl. No.: 10/458,349

(22) Filed: Jun. 10, 2003

(65) Prior Publication Data

US 2003/0234995 A1    Dec. 25, 2003

(30) Foreign Application Priority Data

Jun. 12, 2002  (JP) ............................. 2002-171738
Apr. 3, 2003   (JP) ............................. 2003-100624

(51) Int. Cl.
*C09B 47/10* (2006.01)
*C07D 487/22* (2006.01)
*F21V 9/04* (2006.01)

(52) U.S. Cl. .................. 540/139; 540/137; 540/140; 252/587; 524/88

(58) Field of Classification Search ............ 540/139, 540/137, 140; 252/587; 524/88
See application file for complete search history.

(56) References Cited

U.S. PATENT DOCUMENTS

| 5,804,102 A | 9/1998 | Oi et al. ...................... 252/587 |
| 6,069,244 A * | 5/2000 | Masuda et al. ............. 540/139 |

FOREIGN PATENT DOCUMENTS

| JP | 06-025548 | 2/1994 |
| JP | 10-78509 | 3/1998 |
| JP | 2002-114790 | 4/2002 |
| JP | 2002-123180 | 4/2002 |
| JP | 2002-228828 | 8/2002 |

* cited by examiner

*Primary Examiner*—James O. Wilson
*Assistant Examiner*—Paul V. Ward
(74) *Attorney, Agent, or Firm*—Occhiuti, Rohlicek & Tsao LLP

(57) ABSTRACT

A phthalocyanine compound (1) of a specific structure excelling in ability to absorb near infrared, ability to effect selective absorption of near infrared radiation particularly in a wavelength range exceeding 920 nm and falling short of 1050 nm, solubility in a solvent as well, compatibility with resin, and in such characteristic properties as heat resistance, light resistance, and weatherability, and a near infrared absorbing filter characterized by using the phthalocyanine compound (1) and phthalocyanine compound (2) having a maximum absorption wavelength at least in the range of 800–920 nm are provided. It enjoys a long service life and permits extensive use without selecting a substrate.

12 Claims, 1 Drawing Sheet

PHTHALOCYANINE COMPOUND, METHOD FOR PRODUCTION THEREOF, AND NEAR INFRARED ABSORBING DYE AND NEAR INFRARED ABSORBING FILTER USING SAME

BACKGROUND OF THE INVENTION

1. Field of the Invention

This invention relates to a novel phthalocyanine compound, a method for the production thereof, and a near infrared absorbing dye, heat ray shielding material, and near infrared absorbing material formed by using the compound.

2. Description of the Related Art

In recent years, a plasma display panel (hereinafter abbreviated as "PDP") which can be applied to a large image plane on a thin wall has been attracting attention. The PDP, however, entails the problem of emitting near infrared radiation during the course of plasma discharge and suffering the near infrared radiation to induce malfunctioning of such electrical apparatuses as domestic TV sets, room coolers, and video decks.

For the purpose of solving the problem of this sort, phthalocyanine compounds having a specific structure have been disclosed in the official gazette of U.S. Pat. No. 6,323,340. These phthalocyanine compounds are characterized by manifesting high permeability to visible radiation and high efficiency of cutting near infrared radiation, possessing excellent ability to permit selective absorption in the near infrared region, and excelling in resistance to heat, light resistance, and weatherability.

There is also an invention which concerns a near infrared radiation-shielding film possessing prominent ability to shield off near infrared radiation and ability to transmit visible radiation (the official gazette of JP-A-2001-133624). This near infrared radiation-shielding film is formed by laminating a transparent resin film layer, a transparent near infrared radiation-shielding layer containing an agent for absorbing near infrared radiation, a transparent resin film layer, and a transparent color tone smoothing layer containing a coloring material capable of smoothing the color tone of the shielding layer and it uses a diimonium type compound as the agent for absorbing near infrared radiation.

In order for the film to be effectively used in a panel such as for a display, it calls for color tone as a quality as well as the property for absorbing near infrared radiation and requires the color tone thereof to be adjusted generally by mixing several kinds of dyes. Some of the dyes which possess an absorbing property in the near infrared region suffer their properties to vary when they are admixed with other dyes or suffer their abilities to absorb near infrared radiation to be varied by a chemical reaction or an inductive interaction. Further, since the manufacture of a panel involves a step for carrying out a melt extrusion or a reaction of polymerization at elevated temperatures, it requires to use a thermally and chemically stable near infrared absorbing material. With a view to coping with a problem such as this, the near infrared absorbing filter which is formed by resorting to such methods as, for example, a casting method or a coating method which uses a solution having a dye possessing an ability to absorb near infrared radiation and a macromolecular resin homogeneously mixed in a solvent, a method of melt extruding a blend of such dye and macromolecular resin, and a method of polymerizing or solidifying a homogeneous mixture of a dye possessing an ability to absorb near infrared radiation with a monomer has been disclosed (the official gazette of JP-A-2002-82219). Since some of the dyes suffer their properties to vary when they are admixed with other dyes, yield to chemical reactions or induced interactions, or lack thermal stability, this filter is made to acquire a capacity for absorbing near infrared radiation in a range fit for an intended application by producing component films by forming methods appropriate to their properties and laminating the component films. The agents for absorbing near infrared radiation include polymethine dyes and phthalocyanine compound type dyes, for example.

The near infrared absorbing film having a resin layer measuring 1–50 microns in thickness and containing at least one kind of near infrared absorbing dye having the maximum absorption wavelength in the range of 800–1200 nm (A dye) and at least one kind of B dye having the maximum absorption wavelength in the range of 575–595 nm and a half-value width of not more than 40 nm formed on a transparent substrate has been also disclosed (the official gazette of WO 02/052531). Phthalocyanine compound type dyes are cited as examples of the near infrared absorbing dyes possessed of the maximum absorption wavelength in the range of 800–1200 nm. Cyanine type dyes are cited as examples of the B dyes possessed of the maximum absorption wavelength in the range of 575–595 nm and a half-value width of not more than 40 nm.

The near infrared absorbing material which uses a transparent resin coating film containing a near infrared absorbing dye and a dye capable of selectively absorbing a wavelength in the range of 550–620 nm has been also disclosed (the official gazette of JP-A-2002-200711). This wavelength corresponds to the orange light that obscures an image and the selective absorption aims to remove this wavelength. In the official gazette, dithiol nickel complexes and diimonium compounds are cited as examples of the near infrared absorbing dye and cyanine type dyes are cited as examples of the dye for selectively absorbing the orange light (in the range of 550–620 nm) respectively. Further, for the near infrared radiation-shielding filter for the use in display, the good transmission in the visible light range is as important a factor as the interception of the near infrared radiation.

It is an object of this invention to provide a phthalocyanine compound capable of forming such a filter as, for example, a near infrared absorbing filter which represses malfunction of remote control by absorbing near infrared radiation of a longer wavelength which causes the difficult absorption by the conventional phthalocyanine compounds and possesses a high transmittance to visible light enough to obtain a clear image as well.

It is another object of this invention to provide a pthalocyanine compound excelling in solubility in a solvent, in compatibility with resin, and in heat resistance, light resistance, and weatherability and a method for the production thereof.

It is yet another object of this invention to provide a near infrared absorbing dye using the phthalocyanine compound and a heat ray shielding material, near infrared absorbing filter, and near infrared absorbing material containing the dye.

SUMMARY OF THE INVENTION

The present inventors have found that a phthalocyanine compound having a specific substituent added to the skeleton of the phthalocyanine compound can manifest high transmittance to visible light and high cutting efficiency of near infrared radiation, excel in ability to absorb selectively the near infrared radiation of wavelengths exceeding 920 nm and not exceeding 1050 nm which is not easily absorbed by the conventional phthalocyanine compounds, in solubility in a solvent, in compatibility with resin, and in heat resistance, light resistance, and weatherability, and thus befits various applications such as a near infrared absorbing dye, a heat ray shielding material, a near infrared absorbing filter and a near infrared absorbing material.

The phthalocyanine compound of this invention exhibits fully satisfactory effects when it is used as a heat ray shielding material possessed of translucency or transparency and aimed at shielding heat ray, a heat ray absorbing shatterproof glass for the use in automobiles, heat ray shielding film or heat ray shielding resin glass, a near infrared absorbing filter having high efficiency of transmitting visible light and high efficiency of cutting near infrared radiation, a near infrared absorbing agent for the use in a toner applied by such non-contact fixation as flash fixation, a near infrared absorbing agent for the use in high-temperature insulation thermal storage fibers, an infrared absorbing agent for the use in fibers possessed of a camouflaging property manifested to the reconnaissance by infrared radiation, a near infrared absorbing dye for writing or reading data in an optical recording medium, a liquid crystal display device, or an optical character reader operating with a semiconductor laser, a near infrared sensitizing agent, a photothermal converting agent in a thermosensitive transfer-thermosensitive perforated plate, a near infrared absorbing filter, an eye strain preventing agent, or a photoconductive material, and as an oncotherapy grade photosensitive dye acquiring highly satisfactory permeation through tissues and absorbing light in a long wavelength range, a color braun tube grade selective absorbing filter, a color toner, an ink jet grade ink, an indelible ink, an indelible bar code ink, a near infrared absorbing ink, a marking agent for positioning photographs and films, a lens and shielding plate for goggles, a tinting agent for facilitating the sortation of plastic debris during the course of reclamation, and a pre-heating auxiliary for fabrication of PET bottles.

Since the phthalocyanine compound of this invention excels in ability to effect selective absorption of near infrared radiation having a wavelength in the range exceeding 920 nm and falling short of 1050 nm, it can be advantageously used particularly for a filter in plasma display among other applications cited above. Such a filter can repress the malfunction such as of remote control because they are capable of effectively absorbing near infrared radiation of such a longer wavelength as renders shielding difficult. Further, it can provide a clear image because it exhibits a transmission of not less than 65% to visible light.

This invention has been perfected in consequence of the discovery that the filter, by using (1) the aforementioned phthalocyanine compound and (2) a phthalocyanine compound having the maximum absorption wavelength at least in the range of 800–920 nm as near infrared absorbing dyes, is enabled to excel in resistance to moisture, resistance to heat, and light resistance, absorb near infrared radiation of wavelengths in a wide range, and exhibit excellent transmission to visible light and acquire excellent properties as for display.

DESCRIPTION OF THE PREFERRED EMBODIMENTS

Figure 1:
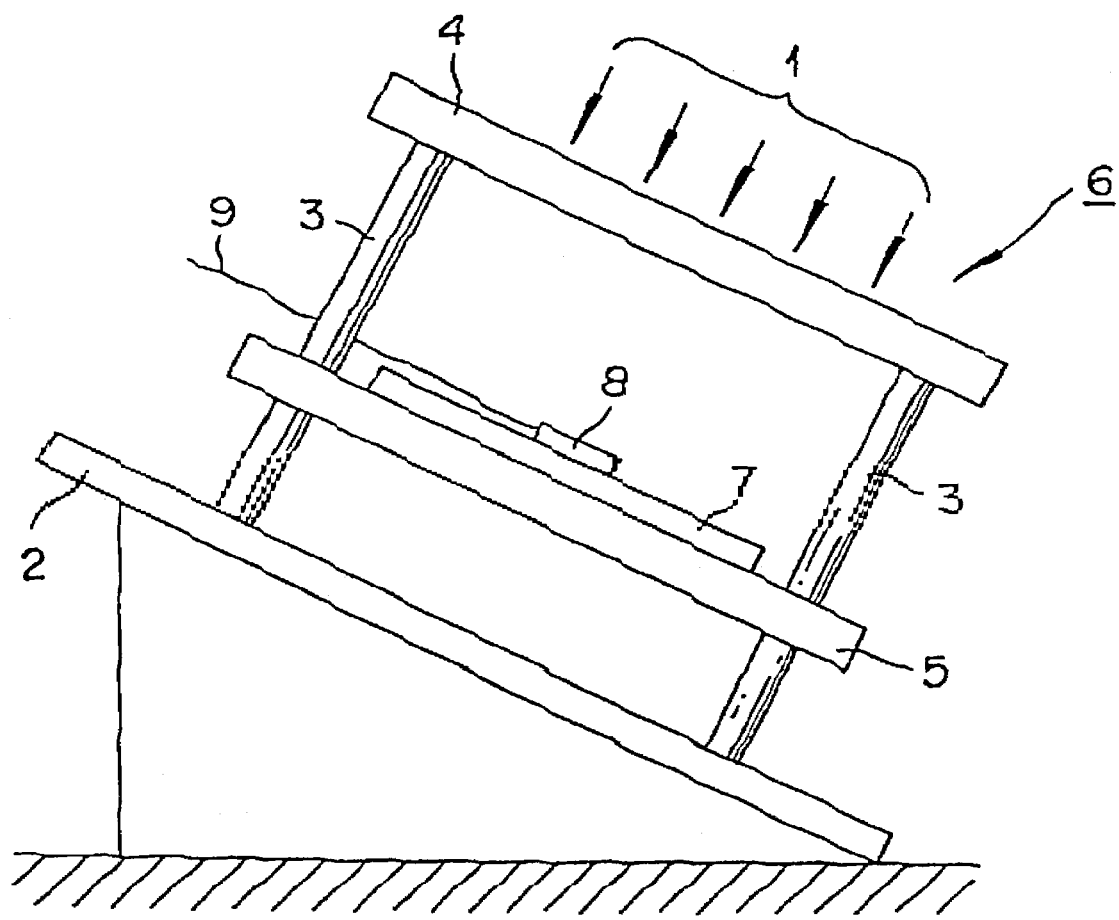
FIG. 1 is a schematic diagram of a temperature measuring device of such a construction as avoided accumulation of heat which was used in Example 27 and Comparative Example 3.

The first aspect of this invention is directed toward a phthalocyanine compound (1) which, by possessing a bulky substituent in the skeleton of phthalocyanine compound, is enabled to effect selective absorption of near infrared radiation of a longer wavelength not satisfactorily absorbed by the conventional phthalocyanine, specifically the near infrared radiation of a wavelength exceeding 920 nm and falling short of 1050 nm and exhibit a high transmission to visible light. The expression "exceeding 920 nm and falling short of 1050 nm" as used in this invention means the range of 920 nm<X. 1050 nm wherein X stands for an optional wavelength.

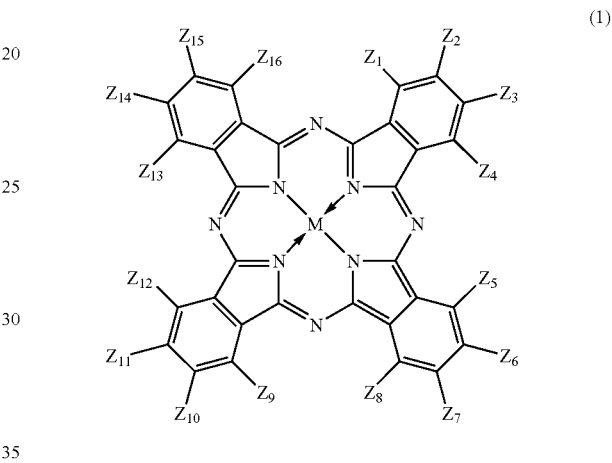

(1)

(wherein $Z_2$, $Z_3$, $Z_6$, $Z_7$, $Z_{10}$, $Z_{11}$, $Z_{14}$, and $Z_{15}$ independently stand for $SR^1$, $SR^2$, $OR^3$, or a halogen atom and at least one of them stands for $SR^2$, $Z_1$, $Z_4$, $Z_5$, $Z_8$, $Z_9$, $Z_{12}$, $Z_{13}$, and $Z_{16}$ independently stand for $NHR^4$, $NHR^5$, $SR^1$, $SR^2$, $OR^3$, or a halogen atom and at least one of them stands for $NHR^5$ and at least four of them stand for $OR^3$, and $R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, $R^3$ and $R^4$ independently stand for a phenyl group optionally having a substituent, an aralkyl group optionally having a substituent, or an alkyl group of 1–20 carbon atoms optionally having a substituent, $R^5$ stands for an alkyl group of 1–20 carbon atoms optionally having a substituent, pluralities respectively of $R^1$, $R^2$, $R^3$, $R^4$, and $R^5$ may be individually identical or different, and M stands for a nonmetal, a metal, a metal oxide, or a metal halide).

In the above formula (1), the symbol "M", stands for a nonmetal, a metal, a metal oxide, or a metal halide. The term "nonmetal" as used herein means atoms other than metal atoms such as, for example, two hydrogen atoms. As typical examples of the metal, iron, magnesium, nickel, cobalt, copper, palladium, zinc, vanadium, titanium, indium, and tin may be cited. As typical examples of the metal oxide, titanyl and vanadyl may be cited. As typical examples of the metal halide, aluminum chloride, indium chloride, germanium chloride, tin(II) chloride, tin(IV) chloride, and silicon chloride may be cited. M is preferably a metal, a metal oxide, or a metal halide. More specifically, copper, zinc, cobalt, nickel, iron, vanadyl, titanyl, chloroindium, and tin(II) chloride are preferably used. More preferably, copper, vanadyl, and zinc are used.

In the aforementioned formula (1), $Z_2$, $Z_3$, $Z_6$, $Z_7$, $Z_{10}$, $Z_{11}$, $Z_{14}$, and $Z_{15}$ (which may be referred to as substituents any of eight β positions in a phthalocyanine nucleus) independently stand for $SR^1$, $SR^2$, $OR^3$, or a halogen atom and at least one of them stands for $SR^2$, and the halogen atom is preferably a fluorine atom or a chlorine atom and particularly preferably a fluorine atom. At least one of $Z_2$, $Z_3$, $Z_6$, $Z_7$, $Z_{10}$, $Z_{11}$, $Z_{14}$, and $Z_{15}$ stands for $SR^2$, preferably not less than four of them each stand for $SR^2$, and particularly preferably all eight of them each stand for $SR^2$. The possession of such an electron donating group as $SR^2$ enables the phthalocyanine compound to increase the absorption wavelength, excel particularly in the transmission exhibited to visible light, and acquire the ability to effect selective absorption of near infrared radiation of a wavelength in the range exceeding 920 nm and falling short of 1050 nm. Further by making the substitution with $SR^2$ first and the substitution with an amino compound subsequently during the process of production, it is made possible to facilitate control of the positions of substitution and produce a phthalocyanine compound excelling in enhancing the compatibility with resin.

In the aforementioned formula (1), $Z_1$, $Z_4$, $Z_5$, $Z_8$, $Z_9$, $Z_{12}$, $Z_{13}$, and $Z_{16}$ (which may be referred to as substituents at any of eight α positions in a phthalocyanine nucleus) independently stand for $NHR^4$, $NHR^5$, $SR^1$, $SR^2$, $OR^3$, or a halogen atom and at least one of them stands for $NHR^5$ and at least four of them each stand for $OR^3$ and the halogen atoms are preferably a fluorine atom or a chlorine atom and particularly preferably fluorine atoms. Preferably 3 or 4 of them are substituted each with $NHR^5$ and 4 or 5 of them each with $OR^3$ and more preferably four of them are substituted each with $NHR^5$ and four of them each with $OR^3$.

Further, at least one of $Z_1$–$Z_{16}$ is preferred to possess fluorine atoms. More preferably, two or three at the eight α positions of a phthalocyanine nucleus each have $NHR^5$ attached thereto, four of them each have $OR^3$ attached thereto, and the remaining one or two of them each have fluorine atoms exclusively attached thereto. The fluorine atoms so incorporated bring an operative effect of not merely enabling control of absorption wavelength, namely increase of the wavelength, but also attaining the synthesis conveniently and the production inexpensively, permitting excellent enhancement of the compatibility of the product with resin as compared with hydrogen atoms and other halogen atoms, and exalting light resistance and resistance to heat.

In the formula, $R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, $R^3$ and $R^4$ independently stand for a phenyl group optionally having a substituent, an aralkyl group optionally having a substituent, or an alkyl group of 1–20 carbon atoms optionally having a substituent, and $R^5$ stands for an alkyl group of 1–20 carbon atoms optionally possessing a aubstituent. When $R^1$, $R^2$, $R^3$, $R^4$, and $R^5$ occur plurally, they may be individually identical or different.

As typical examples of the aralkyl group in $R^1$, $R^3$, and $R^4$, benzyl group, phenethyl group, and diphenylmethyl group may be cited.

As typical examples of the substituent in the phenyl group or the aralkyl group mentioned above, halogen atom, acyl group, alkyl group, phenyl group, alkoxyl group, halogenated alkyl group, halogenated alkoxyl group, nitro group, amino group, alkylamino group, alkylcarbonyl amino group, aryl amino group, aryl carabonyl amino group, carbonyl group, alkoxycarbonyl group, alkyl amino carbonyl group, alkoxy sulfonyl group, alkyl thio group, carbamoyl group, aryloxy cabonyl group, oxyalkyl ether group, and cyano group may be cited. These substituents can enter a phenyl group or an aralkyl group in any number in the range of one to five. When these substituents cooperate in a plurality in this case, they may be identical in kind or different.

The halogen atoms which can be used as substituents in the phenyl group or aralkyl group mentioned above are fluorine atom, chlorine atom, bromine atom, and iodine atom, the chlorine atom being preferred over the other halogen atoms cited.

As typical examples of the acyl group, acetyl group, ethyl carbonyl group, propyl carbonyl group, butyl carbonyl group, pentyl carbonyl group, hexyl carbonyl group, benzoyl group, and p-t-butyl benzoyl group may be cited. The ethyl carbonyl group proves particularly favorable among other groups cited above.

The term "alkyl group" as used herein refers to a linear, branched, or cyclic alkyl group of 1–20 carbon atoms, preferably 1–8 carbon atoms. As typical examples of this alkyl group, methyl group, ethyl ggroup, n-propyl group, isopropyl group, n-butyl group, isobutyl group, sec-butyl group, tert-butyl group, n-pentyl group, isopentyl group, neopentyl group, 1,2-dimethylpropyl group, n-hexyl group, cyclohexyl group, 1,3-dimethylbutyl group, 1-isopropyl propyl group, 1,2-dimethyl butyl group, n-heptyl group, 1,4-dimethyl pentyl group, 2-methyl-1-isopropyl propyl group, 1-ethyl-3-methyl butyl group, n-octyl group, and 2-ethyl hexyl group may be cited. The methyl group and ethyl group prove particularly favorable among other groups mentioned above.

The term "alkoxyl group" as used herein refers to a linear, branched, or cyclic alkoxyl group of 1–20 carbon atoms, preferably 1–8 carbon atoms. As typical examples of this alkoxyl group, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, 1,2-dimethyl-propoxy group, n-hexyloxy group, cyclohexyloxy group, 1,3-dimethylbutoxy group, and 1-isopropyl propoxy group may be cited. The methoxy group and ethoxy group prove particularly favorable among other groups mentioned above.

The term "halogenated alkyl group" as used herein refers to a partially halogenated linear, branched, or cyclic alkyl group of 1–20 carbon atoms, preferably 1–8 carbon atoms. As typical examples of this halogenated alkyl group, chloromethyl group, bromomethyl group, trifluoromethyl group, chloroethyl group, 2,2,2-trichloroethyl group, bromoethyl group, chloropropyl group, and bromppropyl group maybe cited.

The term "halogenated alkoxyl group" as used herein refers to a partially halogenated linear, branched, or cyclic alkoxyl group of 1–20 carbon atoms, preferably 1–8 carbon atoms. As typical examples of this halogenated alkoxyl group, chloromethoxy group, bromomethoxy group, trifluoromethoxy group, chloroethoxy group, 2,2,2-trichloroethoxy group, bromoethoxy group, chloropropoxy group, and bromopropoxy group may be cited.

The term "alkylamino group" as used herein refers to an alkylamino group possessing an alkyl site of 1–20 carbon atoms, preferably 1–8 carbon atoms. As typical examples of this alkylamino group, methylamino group, ethylamino group, n-propylamino group, n-butylamino group, sec-butylamino group, n-pentylamino group, n-hexylamino group, n-heptylamino group, n-octylamino group, and 2-ethylhetylamono group may be cited. The methyl amino group, ethylamino group, n-propylamino group, and n-butylamino group prove particularly favorable among other groups mentioned above.

The term "alkoxycarbonyl group" as used herein refers to an alkoxycarbonyl of 1–8 carabon atoms, preferably 1–5 carbon atoms, optionally containing a hetero atom in the alkyl group moiety of alkoxyl group or a cyclic alkoxycarbonyl of 3–8 carbon atoms, preferably 5–8 carbon atoms, optionally containing a hetero atom. As typical examples of this alkoxycarbonyl group, methoxy carbonyl group, ethoxy carboynyl group, n-propoxy carbonyl group, isopropoxy carbonyl group, n-butoxy carbonyl group, isobutoxy carbonyl group, sec-butoxy carbonyl group, and tert-butoxy carbonyl group may be cited. The methoxy carbonyl group and ethoxy carbonyl group prove particularly favorable among other groups mentioned above.

The unsubstituted alkyl group of 1–20 carbon atoms in $R^1$, $R^3$, and $R^4$ is a linear, branched, or cyclic alkyl group of 1–20 carbon atoms, preferably 1–8 carbon atoms. As typical examples of this unsubstituted alkyl group, methyl group, ethyl group, n-propyl group, isopropyl group, n-butyl group, isobutyl group, sec-butyl group, tert-butyl group, n-pentyl group, isopentyl group, neopentyl group, 1,2-dimethyl propyl group, n-hexyl group, cyclohexyl group, 1,3-dimethylbutyl group, 1-isopropyl propyl group, 1,2-dimethylbutyl group, n-heptyl group, 1,4-dimethylpentyl group, 2-methyl-1-isopropyl propyl group, 1-ethyl-3-methylbutyl group, n-octyl group, and 2-ethylhexyl group may be cited. The methyl group, ethyl group, n-propyl group, isopropyl group, and n-butyl group prove particularly favorable among other groups mentioned above.

As typical examples of the substituent for the alkyl group mentioned above, halogen atoms, alkoxyl group, hydroxyl alkoxyl group, alkoxyl alkoxyl group, halogenated alkoxyl groups, nitro group, amino group, alkylamino group, alkoxycarbonyl group, alkylamino carbonyl group, and alkoxy sulfonyl group may be cited. When these substituents are used in plurality, they may be identical in kind or different.

The phthalocyaine compound (1) mentioned above is characterized by possessing $SR^2$ at any of the β positions in a phthalocyanine nucleus. The introduction of $SR^2$ at such a β position can exalt the ability thereof to effect selective absorption of near infrared radiation having a wavelength exceeding 920 nm and falling short of 1050 nm.

The symbol "$R^2$" in the $SR^2$ stands for a phenyl group optionally possessing an alkoxyl group of 1–20 carbon atoms. This alkoxyl group is preferred to be an alkoxyl group drived from a linear, branched, or cyclic alkyl of 1–20 carbon atoms, preferably 1–8 carbon atoms. A phenyl group may incorporate therein one to five such alkoxyl groups, preferably one alkoxyl group. When a plurality of such alkoxyl groups cooperate in the substitution, they may be identical in kind or different. As typical examples of the alkoxyl group mentioned above, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, 1,2-dimethylpropoxy group, n-hexyloxy group, cyclohexyl group, 1,3-dimethylbutoxy group, 1-isopropylpropoxy group, 1,2-dimethylbutoxy group, n-heptyloxy group, 1,4-dimethyl pentyloxy group, 2-methyl-1-isopropyl propoxy group, 1-ethyl-3-methyl butoxy group, n-octyloxy group, and 2-ethylhexyloxy group may be cited. Though the position at which such an alkoxyl group is incorporated for substitution in the phenyl group does not need to be particularly restricted, it is preferred to be 2 position or 4 position. In these alkoxyl groups, the methoxy group and ethoxy group prove more favorable because they are prominently effective in exalting the ability to attain selective absorption of near infrared radiation having a wavelength exceeding 920 nm and falling short of 1050 nm and the methoxy group proves most favorable. More specifically, the $SR^2$ is preferred to be phenyl thio group, 2-methoxyphenyl thio group, or 4-methoxyphenyl thio group.

The aforementioned phthalocyanine compound (1) is further characterized by possessing $NHR^5$ at an . position in a phthalocyanine nucleus. The $NHR^5$ is such an amino group as possesses a bulky substituent with a strong electron donating property. The introduction of this $NHR^5$ at an a position in a phthalocyanine nucleus can exalt the ability of selective absorption of near infrared radiation of a wavelength exceeding 920 nm and falling short of 1050 nm and realize a prominent enhancement of the compatibility with resin as well.

The symbol "$R^5$" in the $NHR^5$ stands for an alkyl group of 1–20 carbon atoms optionally having a substituent. As typical examples of the unsubstituted alkyl group of 1–20 carbon atoms, methyl group, ethyl group, n-propyl group, isopropyl group, n-butyl group, isobutyl group, sec-butyl group, tert-butyl group, n-pentyl group, isopentyl group, neopentyl group, 1,2-dimethyl propyl group, n-hexyl group, cyclohexyl group, 1,3-dimethyl butyl group, 1-isopropyl propyl group, 1,2-dimethyl butyl group, n-heptyl group, 2-heptyl group, 1,4-dimethyl pentyl group, 2-methyl-1-isopropyl propyl group, 1-ethyl-3-methyl butyl group, n-octyl group, 2-ethyl hexyl group, 2-methyl hexyl group, 2-propyl hexyl group, n-nonyl group, isononyl group, n-decyl group, isodecyl group, n-undecyl group, isoundecyl group, n-dodecyl group, isododecyl group, n-tridecyl group, isotridecyl group, n-tetradecyl group, isotetradecyl group, n-pentadecyl group, isopentadecyl group, n-hexadecyl group, isohexadecyl group, n-heptadecyl group, isoheptadecyl group, n-octadecyl group, isooctadecyl group, n-nonadecyl group, isononadecyl group, n-icocyl group, and isoicocyl group may be cited. Among other alkyl groups mentioned above, long-chain alkyl groups of not less than five carbon atoms and alkyl groups branched at carbon atoms falling at the second position at least as reckoned from the nitrogen atom of amino group prove particularly favorable. These alkyl groups are favorable because they are so bulky as to impart a high electron donating property to the phthalocyanine compound and exalt the ability thereof to effect selective absorption of near infrared radiation of a wavelength exceeding 920 nm and falling short of 1050 nm. To be specific, 1,2-dimethyl propyl group, cyclohexyl group, 2-heptyl group, n-hexyl group, 2-ethylhexyl group, n-octyl group, 2-methylhexyl group, n-octadecyl group, and 2-propylhexyl group prove favorable because they possess particularly high effects in exalting the ability of the phthalocyanine compound to effect selective absorption of near infrared radiation of a wavelength exceeding 920 nm and falling short of 1050 nm.

The substituents for the alkyl groups mentioned above are alkoxyl groups of 1–20 carbon atoms or nitrogen-containing groups of 1–20 carbon atoms. As typical examples of the alkoxyl group mentioned above, methoxy group, ethoxy group, n-propoxy group, isopropoxy group, n-butoxy group, isobutoxy group, sec-butoxy group, tert-butoxy group, n-pentyloxy group, isopentyloxy group, neopentyloxy group, 1,2-dimethyl propoxy group, n-hexyloxy group, cyclohexyloxy group, 1,3-dimethyl butoxy group, 1-isopropyl propoxy group, 1,2-dimethyl butoxy group, n-heptyloxy group, 1,4-dimethyl pentyloxy group, 2-methyl-1-isopropyl propoxy group, 1-ethyl-3-methyl butoxy group, n-octyloxy group, and 2-ethylhexyloxy group may be cited. Among other alkoxy groups mentioned above, ethoxy group, isopropoxy group, n-butoxy group, and 2-ethylhexyloxy group prove favorable because they possess particularly high effects in exalting the ability to effect selective absorption of near infrared radiation of a wavelength exceeding 920 nm and falling short of 1050 nm.

As particularly preferable examples of the alkyl group possessing such an alkoxyl group of 1–20 carbon atoms as mentioned above, 3-ethoxypropyl group, 3-isopropoxypropyl group, 3-butoxypropyl group, and 3-(2-ethylhexyloxy) propyl group may be cited. By possessing such a group at the . position, the phthalocyanine compound (1) is enabled to exalt the ability thereof to effect selective absorption of near infrared radiation of a wavelength exceeding 920 nm and falling short of 1050 nm.

The nitrogen-containing group mentioned above is preferred to be an univalent group produced by removing one hydrogen atom from a primary amine (general formula: $RNH_2$) or a secondary amine (general formula: $R_2NH$) or an univalent group derived from a heterocyclic compound possessing a nitrogen atom as a hetero atom (providing that the free valency is possessed by nitrogen atom). The symbol "R" in the formula stands for an alkyl group of 1–20 carbon atoms. When the alkyl groups occur in a plurality, they may be identical in kind or different. These alkyl groups may be selected among the alkyl groups which optionally are present in a phenyl group or an aralkyl group as indicated in the description of the aforementioned formula (1). The nitrogen-containing group mentioned above is preferably an univalent group produced by the removal of one hydrogen atom from a secondary amine. Preferred examples of the univalent group derived from a heterocyclic compound possessing a nitrogen atom as a hetero atom (providing that the free valency is possessed by the nitrogen atom) are piperazino group, piperidine group, and morpholino group.

As particularly preferable examples of the nitrogen-containing group, N,N-diethylamino group, N,N-diisopropylamino group, N,N-di-n-butylamino group, N,N-diethylaminoethyl group, N,N-diisopropylaminoethyl group, N,N-di-n-butylaminoethyl group, 2-piperazinoethyl group, 2-piperidinoethyl group, and 2-morpholinoethyl group may be cited. By possessing such a group at the α position, the phthalocyanine compound (1) is enabled to exalt the ability thereof to effect selective absorption of near infrared radiation of a wavelength exceeding 920 nm and falling short of 1050 nm.

The following compounds may be cited as typical examples of the aforementioned phthalocyanine compound (1) which has a non-metal as M. In the following compounds, the 3 and 6 positions are α positions of a phthalocyanine nucleus (positions of substitution of $Z_1$, $Z_4$, $Z_5$, $Z_8$, $Z_9$, $Z_{12}$, $Z_{13}$, and $Z_{16}$) and the 4 and 5 positions are β positions of a phthalocyanine nucleus (positions of substitution of $Z_2$, $Z_3$, $Z_6$, $Z_7$, $Z_{10}$, $Z_{11}$, $Z_{14}$, and $Z_{15}$). In the abbreviations of the following compounds, Pc stands for a phthalocyanine nucleus, eight substituents incorporated at the β positions are indicated immediately behind Pc, and eight substituents incorporated at the α position are indicated behind the substituents incorporated at the β position.

4,5-Octakisphenylthio-3,6-tetrakis(2,6-dimethylphenoxy)-tetrakis(N,N-diethylethylenediamino)phthalocyanine compound Abbreviation: $Pc(PhS)_8\{2,6-(CH_3)_2PhO\}_4\{(C_2H_5)_2NCH_2CH_2NH\}_4$ 4,5-Octakis(2-methoxyphenylthio)-3,6-tetrakis(2,6-dimethylphenoxy)-tetrakis(N,N-diethylethylenediamono)phthalocyanine compound Abbreviation: $Pc\{2-(CH_3O)PhS\}_8\{2,6-(CH_3)_2PhO\}_4\{(C_2H_5)_2NCH_2CH_2NH\}_4$ 4,5-Octakisphenylthio-3,6-tetrakis(2,6-dimethylphenoxy)-tetrakis(N,N-diisopropylethylenediamino)phthalycianine compound Abbreviation: $Pc(PhS)_8\{2,6-(CH_3)_2PhO\}_4[\{(CH_3)_2CH\}_2NCH_2CH_2NH]_4$ 4,5-Octakisphenylthio-3,6-tetrakis(2,6-dimethylphenoxy)-tetrakis(N,N-di-n-butylethylenediamino)phthalocyanine compound Abbreviation: $Pc(PhS)_8\{2,6-(CH_3)_2PhO\}_4[\{CH_3(CH_2)_2CH\}_2NCH_2CH_2NH]_4$ 4,5-Octakisphenylthio-3,6-tetrakis(2,6-dimethylphenoxy)-tetrakis(2-piperadinoethylamino) phthalocyanine compound

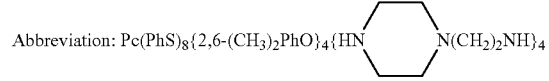

4,5-Octakisphenylthio-3,6-tetrakis(2,6-dimethylphenoxy)-tetrakis(2-piperizinoethylamino) phthalocyanine compound

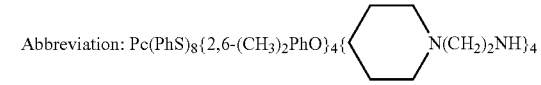

4,5-Octakisphenylthio-3,6-tetrakis(2,6-dimethylphenoxy)-tetrakis(2-morpholinoethylamino) pthalocyanine compound

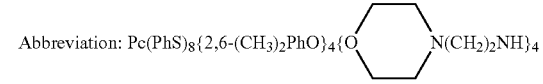

4,5-Octakisphenylthio-3,6-tetrkis(2,6-dimethylphenoxy)-tetrakis(3-ethoxypropylamino) phthalocyanine compound Abbreviation: $Pc(PhS)_8\{2,6-(CH_3)_2PhO\}_4\{(CH_3CH_2O(CH_2)_3NH\}_4$ 4,5-Octakisphenylthio-3,6-tetrakis(2,6-dimethylphenoxy)-tetrakis(3-isopropoxypropylamino)phthalocyanine compound Abbreviation: $Pc(PhS)_8\{2,6-(CH_3)_2PhO\}_4\{(CH_3)_2CHO(CH_2)_3NH\}_4$ 4,5-Octakisphenylthio-3,6-tetrakis(2,6-dimethylphenoxy)-tetrakis(3-butoxypropylamino) phthalocyanine compound Abbreviation: $Pc(PhS)_8\{2,6-(CH_3)_2PhO\}_4\{CH_3(CH_2)_3O(CH_2)_3NH\}_4$ 4,5-Octakisphenylthio-3,6-tetrakis(2,6-dimethylphenoxy)-tetrakis{3-(2-ethylhexyloxy) propylamino}phthalocyanine compound Abbreviation: $Pc(PhS)_8\{2,6-(CH_3)_2PhO\}_4\{CH_3(CH_2)_3CH(C_2H_5)CH_2O(CH_2)_3NH\}_4$ 4,5-Octakisphenylthio-3,6-tetrakis(2,6-dimethylphenoxy)-tetrakis(1,2-dimethylpropylamino)phthalocyanine compound Abbreviation: Pc(PhS)$_8${2,6-(CH$_3$)$_2$PhO}$_4${CH$_3$CH$_2$C(CH$_3$)$_2$NH}$_4$ 4,5-Octakisphenylthio-3,6-tetrkis(2,6-dimethylphenoxy)-tetrakis(cyclohexylamino) phthalocyanine compound Abbreviation: Pc(PhS)$_8${2,6-(CH$_3$)$_2$PhO}$_4$( 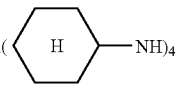 —NH)$_4$ 4,5-Octakisphenylthio-3,6-tetrakis(2,6-dimethylphenoxy)-tetrakis(2-heptylamino) phthalocyanine compound Abbreviation: Pc(PhS)$_8${2,6-(CH$_3$)$_2$PhO}$_4${CH$_3$(CH$_2$)$_4$CH(CH$_3$)NH}$_4$ 4,5-Octakisphenylthio-3,6-tetrakis(2,6-dimethylphenoxy)-tetrakis(n-hexylamino) phthalocyanine compound Abbreviation: Pc(PhS)$_8${2,6-(CH$_3$)$_2$PhO}$_4${CH$_3$(CH$_2$)$_5$NH}$_4$ 4,5-Octakisphenylthio-3,6-tetrakis(2,6-dimethylphenoxy)-tetrakis(2-ethylhexylamino) phthalocyanine compound Abbreviation: Pc(PhS)$_8${2,6-(CH$_3$)$_2$PhO}$_4${CH$_3$(CH$_2$)$_3$CH(C$_2$H$_5$)CH$_2$NH}$_4$ 4,5-Octakis(4-methoxyphenylthio)-3,6-tetrakis(2,6-dimethylphenoxy)-tetrakis(2-ethylhexylamino) phthalocyanine compound Abbreviation: Pc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$ 4,5-Octakisphenylthio-3,6-tetrakis(2,6-dimethylphenoxy)-tetrakis(n-octylamino) phthalocyanine compound Abbreviation: Pc(PhS)$_8${2,6-(CH$_3$)$_2$PhO}$_4${CH$_3$(CH$_2$)$_7$NH}$_4$ 4,5-Octakisphenylthio-3,6-tetrakis(2,6-dimethylphenoxy)-tetrakis(n-octadecylamino) phthalocyanine compound Abbreviation: Pc(PhS)$_8${2,6-(CH$_3$)$_2$PhdO}$_4${CH$_3$(CH$_2$)$_{17}$NH}$_4$ The second aspect of this invention is directed toward a near infrared absorbing dye formed of a phthalocyanine compound, which in a solution containing the phthalocyanine compound at a concentration such that the lowest value of the transmittance at a wavelength exceeding 920 nm and falling short of 1050 nm falls in the range of 5–6%, exhibits transmittance to visibly light of not less than 65%, preferably not less than 70%, in the determination of a transmission spectrum. The dye having a high transmittance to visible ray, an excellent near infrared absorbing ability, and a high efficiency of cutting near infrared transmission can be also used as a near infrared absorbing agent for a heat ray shielding material, a near infrared absorbing filter, particularly a plasma display filter, a non-contact fixing toner such as for flash fixation, and high temperature insulation thermal storage fibers. Particularly by using the phthalocyanine compound, the near infrared absorbing dye is made to excel in solubility, heat resistance, and light resistance and also excel in the transmission in the region of visible light.

As the phthalocyanine compound of this description, the phthalocyanine compound (1) according to this invention can be used. The compound (1) is also at an advantage in excelling in such characteristic properties as compatibility with resin, heat resistance, light resistance, and weatherability. In all the phthalocyanine compounds which are represented by the formula (1) mentioned above, those phthalocyanine compounds having vanadyl as the central metal prove particularly favorable. Specifically, VOPc(PhS)$_8${2,6-(CH$_3$)$_2$PhO}$_4${(C$_2$H$_5$)$_2$NCH$_2$CH$_2$NH}$_4$,
VOPc{2-(CH$_3$O)PhS}$_8${2,6-(CH$_3$)$_2$PhO}$_4${(C$_2$H$_5$)$_2$NCH$_2$CH$_2$NH}$_4$,
VOPc(PhS)$_8${2,6-(CH$_3$)$_2$PhO}$_4$[{(CH$_3$)$_2$CH}$_2$NCH$_2$CH$_2$NH]$_4$,
VOPc(PhS)$_8${2,6-(CH$_3$)$_2$PhO}$_4$[{CH$_3$(CH$_2$)$_3$}$_2$NCH$_2$CH$_2$NH]$_4$,

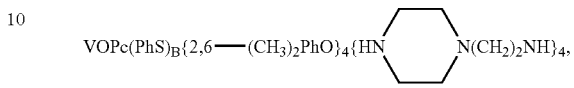

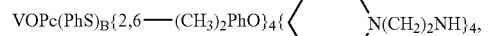

VOPc(PhS)$_8${2,6-(CH$_3$)$_2$PhO}$_4${CH$_3$CH$_2$O(CH$_2$)$_3$NH}$_4$,
VOPc(PhS)$_8${2,6-(CH$_3$)$_2$PhO}$_4${(CH$_3$)$_2$CHO(CH$_2$)$_3$NH}$_4$,
VOPc(PhS)$_8${2,6-(CH$_3$)$_2$PhO}$_4${CH$_3$(CH$_2$)$_3$O(CH$_2$)$_3$NH}$_4$,
VOPc(PhS)$_8${2,6-(CH$_3$)$_2$PhO}$_4${CH$_3$(CH$_2$)$_3$CH(C$_2$H$_5$)CH$_2$O(CH$_2$)$_3$NH}$_4$,
VOPc(PhS)$_8${2,6-(CH$_3$)$_2$PhO}$_4${CH$_3$(CH$_2$)$_5$NH}$_4$,
VOPc(PhS)$_8${2,6-(CH$_3$)$_2$PhO}$_4${CH$_3$(CH$_2$)$_3$CH(C$_2$H$_5$)CH$_2$NH}$_4$,
VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$,
VOPc(PhS)$_8${2,6-(CH$_3$)$_2$PhO}$_4${CH$_3$(CH$_2$)$_7$NH}$_4$, and
VOPc(PhS)$_8${2,6-(CH$_3$)$_2$PhO}$_4${CH$_3$(CH$_2$)$_{17}$NH}$_4$ are favorable because they excel in the ability to effect selective absorption of near infrared radiation of a wavelength exceeding 920 nm and falling short of 1050 nm and in the light resistance as well.

Two or more kinds of the phthalocyanine compounds (1) mentioned above may be used in a mixed state. When two or more kinds of phthalocyanine compounds having different absorption wavelengths are used, the effect of shielding heat ray is enhanced. For example, phthalocyanine compounds (1a) and (1b) which will be specifically described herein below and which have different maximum absorption wavelengths may be used in combination.

The solvents which the near infrared absorbing dye of this invention is allowed to use in the determination of transmission spectrum are chloroform, toluene, tetrahydrofuran, and acetone, for example. The lowest value of the transmittance and the transmission to visible ray determined of a sample in the state of a solution are specified herein as necessary conditions because the phthalocyanine compound which gives different absorption spectra in the state of crystals and in the state of a solution is actually used more often than not in the form of a solution and, therefore, is rated for the magnitudes mentioned above in the state of actual use. The reason for setting the lowest value of transmittance at a magnitude in the range of 5–6% is that the near infrared absorbing dye is actually used in most cases with the transmittance of near infrared radiation set at a magnitude in the range of 5–6%.

The third aspect of this invention is directed toward a heat ray shielding material which comprises the phthalocyanine compound (1) mentioned above and a resin and incorporates the phthalocyanine compound (1) in a proportion in the range of 0.0005–20 parts, preferably 0.001–10 parts, based on 100 parts of the resin. This heat ray shielding material, in the determination of a transmission spectrum, is preferred to give a high transmittance to the visible ray, specifically a transmittance of not less than 65%. The heat ray shielding material, by selectively absorbing near infrared radiation and shielding the heat from the solar light while keeping the transmittance in the visible range intact at a relatively high level, is enabled to serve satisfactorily the purpose of shielding heat ray. Further by excelling in compatibility with resin and enjoying prominent performance in heat resistance, light resistance, and weatherability, the heat ray shielding material is enabled to manifest an outstanding operative effect without a sacrifice of the performance. The general-purpose thermoplastic resin, owing to the excellent heat resistance, can be used in forming the heat ray shielding material by such a forming method as injection molding, extrusion molding, etc. which excels in productivity.

The resin which can be used in the heat ray shielding material of this invention is preferred to be substantially transparent and not to induce unduly large absorption or scattering. As typical examples of the resin satisfying this description, polycarbonate resin; (meth)acrylic resins such as methyl methacrylate; polystyrene; polyvinyl resins such as polyvinyl chloride and polyvinyl idene chloride; polyolefin resins such as polyethylene and polypropylene; polybutyral resin; vinyl acetate type resins such as polyvinyl acetate; and polyester resins and polyamide resins may be cited. These resins are usable not merely singly but also in the form of a blend of two or more kinds so far as the substantial transparency does not need to be sacrificed. Optionally, such a resin may be used as sandwiched between two opposed sheets of transparent glass. Among other resins mentioned above, polycarbonate resin, (meth)acrylic resin, polyester resin, polystyrene resin, or polyvoinyl chloride prove favorable and polycarbonate resin, methacrylic resin, polyethylene terephthalate (PET) resin, or polyvinyl chloride prove particularly favorable on account of their excellence in weatherability and transparency.

The polycarbonate resin is produced by the reaction of a divalent phenol with a carbonate precursor in accordance with a solution method or a fusion method. As typical examples of the divalent phenol, 2,2-bis(4-hydroxyphenyl) propane [Bis-phenol A], 1,1-bis(4-hydroxyphenyl) ethane, 1,1-bis(4-hydroxyphenyl) cyclohexane, 2,2-bis(4-hydroxy-3,5-dimethylphenyl) propane, 2,2-bis(4-hydroxy-3,5-dibromophenyl) propane, 2,2-bis(4-hydroxy-3-methylphenyl) propane, bis(4-hydroxyphenyl) sulfide, and bis(4-hydroxyphenyl) sulfone may be cited. Preferable divalent phenols are of the bis(4-hydroxyphenyl) alkane type, particularly those having bisphenol as a main component.

As typical examples of the acrylic resin, methyl methacrylate available wholly, a polymerizing unsaturated monomer mixture containing not less than 50% of methyl methacrylate, and copolymers there of may be cited. As typical examples of the polymerizing unsaturated monomer which is copolymerizable with methyl methacrylate, methyl acrylate, ethyl (meth)acrylate, butyl (meth)acrylate, cyclohexyl (meth)acrylate, 2-ethylhexyl (meth)acrylate, methoxyethyl (meth)acrylate, ethoxyethyl (meth)acrylate, 2-hydroxyethyl (meth)acrylate, N,N-diethylaminoethyl (meth)acrylate, glycidyl (meth)acrylate, tribromophenyl (meth)acrylate, tetrahydroxyfurfuryl (meth)acrylate, ethylene glycol di(meth) acrylate, triethylene glycol di(meth)acrylate, tripropylene glycol di(meth)acrylate, trimethylol ethane di(meth)acrylate, neopentyl glycol di(meth)acrylate, trimethylol propane tri(meth)acrylate, and pentaerythritol tetra(meth)acrylate may be cited.

As the vinyl chloride resin, not merely the polymer formed solely of vinyl chloride as a monomer but also the copolymers having vinyl chloride as a main component may be used. As typical examples of the monomer which can be copolymerized with vinyl chloride, vinylidene chloride, ethylene, propylene, acrylonitrile, vinyl acetate, maleic acid, itaconic acid, acrylic acid, and methacrylic acid may be cited.

The phthalocyanine compound (1) to be used in the heat ray shielding material of this invention is allowed to have the proportion thereof varied by the magnitude of the transmittance of the heat ray shielding material in the visible and near infrared range and the thickness of the heat ray shielding material. Generally, the proportion is in the range of 0.0005–20 parts by weight, preferably 0.0010–10 parts by weight, based on 100 parts by weight of the resin.

The optimum range of the amount of the phthalocyanine compound (1) formulated can be properly selected depending on the thickness of the heat ray shielding material. In the manufacture of the heat ray shielding sheet having a thickness of 3 mm, for example, this proportion is generally in the range of 0.002–0.06 part by weight, preferably 0.003–0.02 part by weight, based on 100 parts by weight of the resin. Then, in the manufacture of the heat ray shielding plate having a thickness of 10 mm, for example, this proportion is preferably in the range of 0.0005–0.02 part by weight, and more preferably 0.001–0.005 part by weight, based on 100 parts by weight of the resin. In the manufacture of the heat ray shielding film having a thickness of 10 μm, the proportion is preferable in the range of 0.1–20 parts by weight, and more preferably 0.5–10 parts by weight, based on 100 parts by weight of the resin. When the proportion is specified in terms of the weight in the area projected from above, it is preferably in the range of $0.01–2.0 \text{ g/m}^2$ and more preferably $0.05–1.0 \text{ g/m}^2$. If the proportion of the phthalocyanine compound in this case falls short of $0.01 \text{ g/m}^2$, the shortage would result in unduly lowering the effect of shielding the heat ray. Conversely, if this proportion exceeds $2.0 \text{ g/m}^2$, the excess would result in unduly boosting the cost and possibly decreasing excessively the transmission of visible light. When the heat ray shielding material is formed in an irregular shape such as, for example, a corrugated sheet, the proportion may be regarded in terms of the weight in the area projected from above. The typical phthalocyanine compounds of the formula (1) mentioned above may be used in the form of a mixture of two or more members. When two or more kinds of such phthalocyanine compounds which have different absorption wavelengths are used together, the heat ray shielding effect they produce is larger than when they are used independently of each other. The combined use of the phthalocyanine compounds (1a) and (1b) which will be described specifically herein below and which have different maximum absorption wavelength may be cited as one typical example.

The heat ray shielding material of this invention may contain various additives which are used in the manufacture of ordinary transparent resin materials. As typical examples of such additives, coloring agent, polymerization adjusting agent, antioxidant, ultraviolet absorbing material, flame retardant, plasticizer, rubber for enhancing the shock resistance, and peeling agent may be cited. As typical examples of the method for incorporating the phthalocyanine compound in the transparent resin and forming the resultant blend, extrusion molding, injection molding, cast polymerization, press forming, calendering, and cast film forming method may be cited.

Further, the heat ray shielding material may be formed by producing a film containing the phthalocyanine compound (1) of this invention and hot pressing or hot laminating this film on a transparent resin material. Alternatively, the heat ray shielding material may be obtained by applying an acrylic resin ink or coating material containing the phthalocyanine compound (1) of this invention to a transparent resin material by printing or coating. Since the phthalocyanine compound (1) of this invention excels in heat resistance as compared with the commercially available infrared absorbing material, the heat ray shielding material may be formed by using acrylic resin, polycarbonate resin, or PET resin in accordance with such a forming method as injection molding or extrusion molding which elevates the resin temperature to such a high level as 200–350° C., with the result that a shaped product rejoining in the sensation of transparency and excelling in the ability to shield the heat ray will be obtained. The molding temperature falling short of 200° C. may be used without inducing any problem. Further, the heat ray shielding material of this invention does not need to be particularly restricted on account of its shape. Besides the most general flat plate or film, the material may assume various shapes such as, for example, a corrugated plate, a sphere, and a dome.

When the phthalocyanine compound and a material such as carbon black which is capable of absorbing heat ray are used in specific proportions, they produce the same heat ray shielding effect as when the phthalocyanine compound is used alone. The combined use, therefore, can decrease the consumption of the phthalocyanine compound to less than half.

The fourth aspect of this invention is directed toward a near infrared absorbing filter which comprises the phthalocyanine compound (1) mentioned above and a resin and incorporates the phthalocyanine compound (1) in a proportion in the range of 0.0005–20 parts by weight, preferably 0.001–10 parts by weight, based on 100 parts by weight of the resin. This filter in the determination of transmission spectrum is preferred to give a high transmittance of visible light, specifically not less than 65%. The phthalocyanine compound (1) allows generous absorption in the range exceeding 920 nm and falling short of 1050 nm, shows a high transmittance to visible light, and further abounds in solubility, heat resistance, and light resistance and, therefore, can be properly used for near infrared absorbing filters, particularly plasma display filters.

Further, the near infrared absorbing filter of this invention can use a phthalocyanine compound (2) having a maximum absorption wavelength at least in the range of 800–920 nm as a near infrared absorbing dye in conjunction with the aforementioned phthalocyanine compound(1). The filters using compounds which have maximum absorption wavelength in the near infrared range have existed heretofore. Actually, phthalocyanine type compounds having a maximum absorption wavelength in the range exceeding 920 nm and avoiding noticeable absorption of light in the visible range have not existed. When a phthalocyanine compound is used as a near infrared absorbing agent, therefore, it calls for simultaneous use of a diimonium salt compound and imposes restriction on the kind of resin to be incorporated for dissolving these different compounds and the selection of a solvent to be used for the solution. The diimonium salt compound is so deficient in thermal stability and light resistance as to impair the durability of the produced filter and render it difficult to secure fully satisfactory transmission in the visible light range. This invention, owing to the use of phthalocyanine compounds in both the near infrared ranges, one extending between 800–920 nm and the other exceeding 920 nm, is enabled to avoid the problems mentioned above, excel in the shielding effect in the near infrared range and secure transmission in the visible light range as well. Moreover, the phthalocyanine compounds excel in heat resistance, light resistance, and weatherability and afford stable service over a protracted period and, therefore, permit production of a near infrared filter of high durability while obviating the necessity for using a diimonium compound deficient in thermal stability and light resistance or decreasing the amount of this compound to be used at all.

Though the concentrations of the phthalocyanine compounds (1) and (2) are varied with the thickness of coating, the intensity of absorption aimed at, and the transmittance to visible light aimed at, the concentration of the phthalocyanine compound (1) is in the range of 20–80% by weight, preferably 30–70% by weight, based on the total amount, i.e. 100% by weight, of these two phthalocyanine compounds (1) and (2). The reason for this limitation is that the use of these compounds in roughly equal amounts enables the produced near infrared filter to attain average absorption over a wide range and increase the transmittance to visible light as well.

This invention prefers to use two kinds of phthalocyanine compounds having maximum absorption wavelengths, one in the range exceeding 920 nm and falling short of 950 nm and the other between 950–1000 nm, as the pthalocyanine compound (1). This is because the use of the two kinds of phthalocyanine compounds enables the produced near infrared filter to acquire average absorption over a wide range and exalt the transmittance to visible light.

In the phthalocyanine compounds (1) mentioned above, those which possess maximum absorption wavelengths exceeding 920 nm and falling short of 950 nm (hereinafter referred to occasionally as "phthalocyanine compound (1a)") include VOPc(PhS)$_8${2,6-(CH$_3$)$_2$PhO}$_4$ {(CH$_3$CH$_2$O (CH$_2$)$_3$NH}$_4$ (λmax 928 nm), VOPc(PhS)$_8${2,6-(CH$_3$)$_2$ PhO}$_4${(CH$_3$)$_2$CHO(CH$_2$)$_3$NH}4 (λmax 930 nm), VOPc (PhS)$_8${2,6-(CH$_3$)$_2$PhO}$_4${CH$_3$(CH$_2$)$_3$O(CH$_2$)$_3$NH}4 (λmax 930 nm), and VOPc(PhS)$_8${2,6-(CH$_3$)$_2$PhO}$_4$ {(CH$_3$ (CH$_2$)$_5$NH}$_4$ (λmax 930 nm) and those which possess maximum absorption wavelengths in the range of 950–1000 nm (herein after referred to occasionally as "phthalocyanine compound (1b)") include phthalocyanine, VOPc{4-(CH$_3$O) PhS}$_8${2,6-(CH$_3$)$_2$PhO}$_4${CH$_3$(CH$_2$)$_3$CH(C$_2$H$_5$)CH$_2$NH}$_4$ (λmax 962 nm), VOPc{2-(CH$_3$O)PhS}$_8${2,6-(CH$_3$)$_2$PhO}$_4$ {(C$_2$H$_5$)$_2$NCH$_2$CH$_3$NH}$_4$ (λmax 950 nm), and VOPc(PhS)$_8$ {2,6-(CH$_3$)$_2$PhO}$_4$[{(CH$_3$)$_2$CH}$_2$NCH$_2$NH]$_4$ (λmax 952 nm). In this invention, the use of two kinds of phthalocyanine compounds having maximum absorption wavelengths, one in the range exceeding 920 nm and falling short of 950 nm and the other between 950–1000 nm, as the pthalocyanine compound (1) is at an advantage in enabling the produced near infrared absorption filter to exalt the transmittance to visible light and cut the near infrared light efficiently.

Though the concentrations of the phthalocyanine compounds (1a) and (1b) are varied with the thickness of coating, the intensity of absorption aimed at, and the transmittance to visible light aimed at, the concentration of the compound (1a) is generally in the range of 20–80% by weight, preferably 30–70% by weight, based on the amount of the phthalocyanine compound (1).

The phthalaocyanine compound (2) mentioned above may be selected from the heretofore known compounds of the description given above. The phthalocyanine compounds represented by the following formula (2) are typical examples.

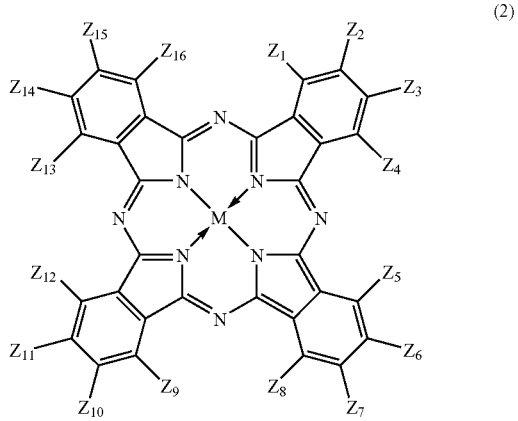

(2)

(wherein $Z_2$, $Z_3$, $Z_6$, $Z_7$, $Z_{10}$, $Z_{11}$, $Z_{14}$, and $Z_{15}$ independently stand for $SR^1$, $OR^3$, or a halogen atom and at least one of them stands for $SR^1$ or $OR^2$, $Z_1$, $Z_4$, $Z_5$, $Z_8$, $Z_9$, $Z_{12}$, $Z_{13}$, and $Z_{16}$ independently stand for $NHR^3$, $SR^1$, $OR^2$, or a halogen atom and at least one of them stands for $NHR^3$ and at least four of them each stand for $OR^2$, and $R^1$, $R^2$, and $R^3$ independently stand for a phenyl group optionally having a substituent, an aralkyl group optionally having a substituent, or an alkyl group of 1–20 carbon atoms optionally having a substituent, pluralities respectively of $R^1$, $R^2$, and $R^3$ may be individually identical or different, and M stands for a nonmetal, a metal, a metal oxide, or a metal halide, providing that the phthalocyanine compounds of the foregoing formula (1) will be excluded).

As typical examples of the phthalocyanine compound of the formula (2), the compounds represented by the formulas, $VOPc(2,5-Cl_2PhO)_8(2,6-Br_2-4-CH_3PhO)_4\{Ph(CH_3)CHNH\}_3F$, $VOPc(2,5-Cl_2PhO)_8(2,6-Br_2-4-CH_3PhO)_4\{PhCH_2NH\}_3F$, $VOPc(2,5-Cl_2PhO)_8(2,6-(CH_3)_2PhO)_4\{Ph(CH_3)CHNH\}_3F$, $VOPc(2,6-Cl_2PhO)_8(2,6-(CH_3)_2PhO)_4\{Ph(CH_3)CHNH\}_3F$, $VOPc(4-CNPhO)_8(2,6-Br_2-4-CH_3PhO)_4\{Ph(CH_3)CHNH\}_3F$, $VOPc(4-CNPhO)_8(2,6-(CH_3)_2PhO)_4\{Ph(CH_3)CHNH\}_3F$, $VOPc(2,5-Cl_2PhO)_8(2,6-(CH_3)_2PhO)_4(PhCH_2NH)_4$, $CuPc(2,5-Cl_2PhO)_8(2,6-(CH_3)_2PhO)_4(PhCH_2NH)_4$, and $VOPc(PhS)_8(2,6-(CH_3)_2PhO)_4(PhCH_2NH)_4$, wherein Pc stands for phthalocyanine nucleus and Ph for a phenyl group, may be cited.

Besides, the fluorine-containing phthalocyanine compound type compounds disclosed in the official gazette of JP-A-2001-133623 (the product of Nippon Shokubai Co., Ltd. sold under the trademark designation of "Excolor IR-1," the product of Nippon Shokubai Co., Ltd. sold uneer the trademark designation of "TX-EX810K," and the product of Mitsui-Toatsu Co., Ltd. sold under the trademark designation of "SIR-159"), the fluorine-containing phthalocyanine compound type dyes disclosed in the official gazette of JP-A-2002-822193 (the product of Nippon Shokubai Co., Ltd. sold under the trademark designation of "Excolor 801K," the product of Nippon Shokubai Co., Ltd. sold under the trademark designation of "Excolor 802K," the product of Nippon Shokubai Co., Ltd. sold under the trademark designation of "Excolor 803K," and the products of the trademark designations of "Excolor IR-10," "Excolor IR-10A," "Excolor IR-14," and "Excolor IR-12") are also usable.

When a phthalocyanine compound having a maximum absorption wavelength in the range of 800–850 nm (hereinafter referred to occasionally as "phthalocyanine compound (2a)") and a phthalocyanine compound having a maximum absorption wavelength in the range of 850–920 nm (hereinafter referred to occasionally as "phthalocyanine compound (2b)" are jointly used as the phthalocyanine compound (2) mentioned above, the produced near infrared absorbing filter will be at an advantage in exalting the transmittance to visible light and absorbing the near infrared ratiation efficiently. Though the concentrations of the phtalocyanine compounds (2a) and (2b) are varied with the thickness of coating, the intensity of absorption aimed at, and the transmittance to visible light aimed at, the concentration of the compound (2a) is in the range of 20–80% by weight, preferably 30–70% by weight, based on the amount of the phthalocyanine compound (2). The reason for this limitation is that the use of these compounds enables the produced near infrared filter to attain average absorption over a wide range and increase the transmittance to visible light as well.

As typical examples of the phthalocyanine compound (2) which possesses a maximum absorption wavelength in the range of 800–850 nm, phthalocyanine $[CuPc(2,5-Cl_2PhO)_8\{2,6-(CH_3)_2PhO\}_4(PhCH_2NH)_4]$ (λmax 807 nm), phthalocyanine $[VOPc(2,5-Cl_2PhO)_8\{2,6-(CH_3)_2PhO\}_4\{Ph(CH)_3CHNH\}_3]F$ (λmax 834 nm), phthalocyanine $[VOPc(2,5-Cl_2PhO)_8\{2,6-Br_2-4-CH_3PhO\}_4 \{Ph(CH)_3CHNH\}_3]F$ (λmax 840 nm), and phthalocyanine $[VOPc(4-CNPhO)_8\{2,6-(CH_3)_2PhO\}_4\{Ph(CH)_3CHNH\}_3F$ (λmax 834 nm) may be cited. As typical examples of the phthalocyanine compound (2) which possesses a maximum absorption wavelength in the range of 850–920 nm, $[VOPc(2,5-Cl_2PhO)_8\{2,6-(CH_3)_2PhO\}_4(PhCH_2NH)_4]$ (λmax 870 nm) and $[VOPc(PhS)_8\{2,6-(CH_3)_2PhO\}_4(PhCH_2NH)_4]$ (λmax 912 nm) may be cited.

The near infrared absorbing filter of this invention contains at least the aforementioned phthalocyanine compound of the formula (1) in the substrate. The term "contains in the substrate" as used herein means the application to the surface of the substrate and the interposition between two opposed substrates besides the inclusion in the interior of the substrate. As typical examples of the substrate, transparent resin plate, transparent film, and transparent glass may be cited. Though the method for manufacturing the near infrared absorbing filter of this invention does not need to be particularly restricted, it may be selected from the following three methods.

Specifically, (i) a method which comprises kneading the aforementioned phthalocyanine compound (1) with a resin and thermally molding the resultant blend and forming a resin sheet or film, (ii) a method which comprises preparing a coating material (in the state of liquid or paste) containing the aforementioned phthalocyanine compound (1) and applying the coating material to a transparent resin sheet, transparent film, or transparent glass sheet, and (iii) a method which comprises causing the aforementioned phthalocyanine compound (1) to be contained in an adhesive agent and depositing the resultant composite liquid between opposed resin sheets, opposed resin films, or opposed glass sheets may be cited. When the phthalocyanine compound (2) is additionally used, it suffices to mix the aforementioned phthalocyaine compounds (1) and (2) and putting the resultant mixture to use.

First, in the method of (i) mentioned above, when the resin material is formed as a resin sheet or resin film, it is preferred to possess the highest possible transparency. As typical examples of this resin material, vinyl compounds such as polyethylene, polystyrene, polyacrylic acid, polyacrylic esters, polyvinyl acetate, polyacrylonitrile, polyvinyl chloride, and polyvinyl fluoride and adduct polymers of such vinyl compounds, polymethacrylic acid, polymethacrylic esters, polyvinylidne chloride, polyvinylidene fluoride, polyvinylidene cyanide, and copolymers of vinyl compounds or fluoride type compounds such as vinylidene fluoride/trifluoroethylene copolymer, vinylidne fluoride/tetrafluoroethylene copolymer, and vinylidene cyanide/vinyl acetate copolymer, fluorine-containing resins such as polytrifluoroethylene, polytetrafluoroethylene, and polyhexafluoropropylene, polyamides such as nylon 6 and nylon 66, polyesters such as polyamide, polyimide, polyurethane, polypeptide, and polyethylene terephthalate, polyethers such as polycarbonate, polyoxymethylene, polyethylene oxide, and polypropylene oxide, epoxy resin, polyvinyl alcohols, and polyvinyl butyral may be cited, through not exclusively. It is also proper to use resins comparable in rigidity and transparency with glass, such thermosetting resins as thiourethane type resins, and such optical resins as the product of Japan Synthetic Rubber Co., Ltd. sold under the trademark designation of "ARTON," the product of Nippon Zeon Co., Ltd. sold under the trademark designation of "ZEONEX," the product of Hitachi Chemical Co., Ltd. sold under the trademark designation of "OPTPOREZ," and the product of Kanebo Ltd. sold under the trademark designation of "O-PET."

Generally, ① a method which comprises adding the aforementioned phthalocyanine compound (1) to a base resin in the form of powder or pellets, heating them to a temperature in the range of 150–350° C. till solution, and forming the produced solution to obtain a resin sheet, ② a method which comprises converting the solution with an extruding machine to obtain a film, and ③ a method which comprises converting the solution with an extruding machine to obtain a stock sheet and stretching the stock sheet uniaxially or biaxially to two to five times the original size at a temperature in the range of 30–120° C. to obtain a film having a thickness in the range of 10–200 μm are available, though the temperature of fabrication and the conditions for film formation are varied more or less by the kind of base resin to be used. During the course of kneading, such additives as ultraviolet absorbent and plasticizer which have been generally used in the molding of resin may be incorporated in the blend in process of formation. The amount of the phthalocyanine compound of this invention to be added generally falls in the range of 0.005–20% by weight, though it is variable with the thickness of a resin sheet to be manufactured, the intensity of absorption aimed at, and the transmittance to visible light aimed at. It is also permissible to manufacture a resin sheet or resin film by using the casting method which resorts to bulk polymerization of the aforementioned phthalocyanine compound (1) and methyl methacrylate.

The method of (ii) mentioned above may be embodied by a process which comprises dissolving the aforementioned phthalocyanine compound (1) in a binder resin and an organic solvent till conversion into a coating material and a process which comprises finely dividing the phthalocyanine compound (1) into particulates measuring not more than several μm in diameter and dispersing the particulates in an acrylic emulsion till formation of water coating material. In the former process, an aliphatic ester type resin, an acrylic resin, a melamine resin, a urethane resin, an aromatic ester type resin, a polycarbonate resin, an aliphatic polyolefin resin, an aromatic polyolefin resin, a polyvinyl resin, a polyvinyl alcohol resin, a polyvinyl type modified resin (such as PVB and EVA, etc.) and copolymer resins thereof are generally available as the binder resin. It is also permissible to use such optical resins as the product of Nippon Synthetic Rubber Co., Ltd. sold under the trademark designation of "ARTON," the product of Nippon Zeon Co., Ltd. sold under the trademark designation of "ZEONEX," the product of Hitachi Ltd. sold under the trademark designation of "OPTPOREZ," and the product of Kanebo Ltd. sold under the trademark designation of "O-PET." As the solvent, a halogen type solvent, an alcohol type solvent, a ketone type solvent, an ester type solvent, an aliphatic hydrocarbon type solvent, an aromatic hydrocarbon type solvent, an ether type solvent, or varying mixture thereof may be used.

The total concentration of the aforementioned phthalocyanine compounds (1) and (2) generally falls in the range of 0.1–30% by weight, based on the weight of the binder resin, through variable with the thickness of coating, the intensity of absorption aimed at, and the transmittance to visible light aimed at. Then, the concentration of the binder resin is generally in the range of 1–50% by weight based on the total weight of the coating material. The acrylic emulsion type water coating material is obtained by finely dividing the phthalocyanine compound of this invention into particulates measuring 950–500 nm in diameter and dispersing the particulates in an uncolored acrylic emulsion coating material. The coating material may incorporate therein such additives as ultraviolet absorbent and antioxidant which are generally used in coating materials.

From the coating material obtained by the method described above, the near infrared absorbing filter of this invention can be manufactured by applying the coating material to a transparent resin film, transparent resin sheet, or transparent glass sheet by means of a bar coater, a blade coater, a spin coater, a reverse coater, a die coater, or a spray coater. The coated surface, for the sake of protection, may be furnished with a protecting layer or overlaid fast by adhesion as with a transparent resin sheet or transparent resin film. The cast film may be similarly relied on for the protection.

As the adhesive agent for the use in the method of (iii) mentioned above, any of the conventional transparent adhesive agents such as polyvinyl butyral adhesive agent (PVA) intended for silicon type, urethane type, and acryl type resins or shatterproof glass and ethylene-vinyl acetate type adhesive agent (EVA) intended for shatterproof glass. The filter is manufactured by joining two transparent resin sheets, a resin sheet with a resin film, a resin sheet with a glass sheet, two resin films, a resin film with a glass sheet, and two glass sheets through the medium of an adhesive agent incorporating therein 0.1–30% by weight of the phthalocyanine compound of this invention. This union of the component sheets may be effected by thermo-compression bonding. The film or sheet manufactured by the method mentioned above, as occasion demands, may be pasted to a glass sheet or a resin sheet. The thickness of this filter is generally in the approximate range of 0.1–10 mm, though it is variable with the specifications used for the plasma display to be manufactured. A transparent film containing a UV absorbent (UV cut film) may be applied to the outside of the filter for the purpose of enhancing the light resistance of the filter.

The near infrared absorbing filter of this invention may be disposed on the front surface of a plasma display as a filter for cutting the near infrared radiation emitted from the display for the purpose of preventing the plasma display from malfunction. The filter's transmittance to visible ray is preferred to be as high as permissible because the clarity of an image is lowered in accordance as the transmittance to visible ray is decreased. Thus, the transmittance ought to be at least 40%, preferably not less than 50%. The range of cutting the near infrared radiation is 750–1100 nm, preferably 800–1000 nm, which is used for remote control or optical transmission. The average transmission of light in this range is not more than 20%, preferably not more than 10%. The filter may incorporate therein other dye possessing absorption in the visible range for the purpose of varying the color tone thereof. It is permissible to prepare a filter containing only a dye for color tone and apply this filter afterward to the surface of the display. When an electromagnetic wave cutting layer formed particularly by spattering is disposed, the color tone constitutes itself an important factor because this layer possibly varies noticeably the tint of the display from the original color of the filter.

The fifth aspect of this invention is directed toward a front panel of a plasma display which uses the aforementioned near infrared absorbing filter. This front panel of plasma display is preferred to have a high transmission of visible light, specifically not less than 65%.

In order for the filter obtained by the method mentioned above to become more practicable, it may be provided with an electromagnetic wave cutting layer for shielding the elecgtromagnetic waves emanating from the plasma display, an antireflection (AR) layer, and a antiglare (AG) layer. The methods for manufacturing such component layers do not need to be particularly restricted. The electromagnetic wave cutting layer, for example, can resort to a method for spattering a metal oxide. Generally, $In_2O_2$ (ITO) incorporating Sn therein is used as the metal oxide. The light of wavelengths exceeding 1100 nm and ranging from near infrared radiation through far infrared radiation to electromagneitc waves can be cut by alternately superposing a dielectric layer and a metal layer by spattering on a substrate. The dielectric layer is formed of such a transparent metal oxide as indium oxide and zinc oxide and the metal layer is generally formed of silver or silver-palladium alloy. The superposition generally starts with a dielectric layer and ends with a third, fifth, seventh, and up to $11^{th}$ layer. In this case, though the superposed layers are capable of cutting the heat emanating from the display as well, the aforementioned phthalocyanine compound (1) can enhance the effect of heat resistance to a greater extent because of its excellent effect of shielding the heat ray. As the substrate, though the filter containing the phthalocyanine compound of this invention may be utilized in its unmodified form, the layers may be superposed by spattering on a resin film or a glass sheet and subsequently overlain with a filter containing the phthalocyanine compound (1). When the filter is actually cut from the electromagnetic waves, it needs to be provided with an electrodes for grounding. In order for the antireflection layer to prevent the surface thereof from causing reflection and aid the filter in enhancing the transmission, it is formed by a process which comprises depositing a single layer or superposing a plurality of layers of such inorganic substances as metal oxide, fluoride, boride, carbide, nitride, or sulfide by vacuum evaporation, sputtering, ion plating, or ion beam assisting or a process which comprises depositing a single layer or superposing a plurality of layers of such resins as acrylic resin and fluorine resin which have different refractive indexes. It is also permissible to deposit a film which has undergone a treatment for prevention of reflection on the filter mentioned above. The filter, as occasion demands, may be further furnished with an antiglare (AG) layer. The antiglare (AG) layer may be formed by a process which comprises converting a finely divided powder of silica, melamine, or acryl into an ink and coating the filter with this ink so as to scatter transmitted light and consequently to broaden visual field of the filter. The curing of this ink may be attained by application of heat or exposure to light. Alternatively, a film which has undergone an antiglare treatment may be pasted to the filter. The filter, when necessary, may be further furnished with a hard coat layer.

The construction of the filter for the use in the plasma display may be varied as occasion demands. Generally, the antireflection layer is superposed on the filter which has contained the near infrared absorbing compound in advance and, when further necessary, an antiglare layer is deposited on the side of the filter opposite the antireflection layer. When the electromagnetic wave cutting layer is to be incorporated in the combination of the layers mentioned above, this incorporation is accomplished by using the filter containing the near infrared absorbing compound as a substrate and depositing the electromagnetic wave cutting layer on the substrate or by pasting a filter containing the near infrared absorbing compound to a filter possessing the ability to cut the electromagnetic waves. In this case, antireflection layers may be formed one each on the opposite surfaces of the filter or, when necessary, an antireflection layer may be formed on one surface of the filter and an antiglare layer formed on the opposite surface. When the filter is required for the sake of color correction to incorporate therein a dye capable of effecting absorption in the visible range, the method for making this incorporation does not need to be particularly restricted. The near infrared absorbing filter of this invention has a high transmittance to visible ray and, therefore, is capable of efficiently cutting the near infrared light of wavelengths in the approximate range of 800–1000 nm emanating from the display without impairing the clarity of display. Consequently, it avoids adversely affecting the wavelengths used in remote control of peripheral electronic devices and in optical transmish and prevents such devices from yielding malfunction.

The sixth aspect of this invention is directed toward a plasma display using the aforementioned front panel of plasma display. The plasma display can be produced by using the aforementioned front panel of plasma display in place of the conventional front panel of plasma display. The front panel of plasma display has a high transmittance to visible light and, therefor, cuts efficiently the near infrared radiation of wavelengths in the approximate range of 800–1000 nm emanating from the display without impairing the clarity of display. The plasma display using this front panel, therefore, avoids adversely affecting the wavelengths used in remote control of peripheral electronic devices and in optical transmission and prevents such devices from yielding malfunction.

The seventh aspect of this invention is directed toward a near infrared absorbing material which comprises the aforementioned phthalocyanine compound (1) and a resin and incorporates the phthalocyanine compound (1) in a proportion in the range of 0.0005–20 parts by weight, preferably 0.001–10 parts by weight, based on 100 parts by weight of the resin. This near infrared absorbing material, in the determination of transmission spectrum, is preferred to show a high transmittance to visible light, specifically not less than 65%. The aforementioned phthalocyanine compound (1) to be used herein may be formed by mixing two or more kinds of such phthalocyanine compound. The use of two or more kinds of phthalocyanine compound having different absorption wavelengths results in enhancing the effect of shielding heat ray. The combined use of the aforementioned phthalocyanine compounds (1a) and (1b) having different maximum absorption wavelengths may be cited as a typical example.

Though the resin to be used in this invention may be properly selected to suit the purpose for which the produced near infrared absorbing material is used, it is preferred to be substantially transparent and incapable of yielding any noticeable absorption and scattering. As typical examples of the resin of this description, polycarbonate resin; (meth) acrylic resins such as methyl methacrylate; polyvinyl resins such as polystyrene, polyvinyl chloride, and polyvinylidene chloride; polyolefin resins such as polyethylene and polypropylene; polybutyral resin; polyvinyl acetate resin; polyester resins such as polyethylene terephthalate; and polyamide resin may be cited. The resins mentioned above do not need to be used singly but may be used in the form of a blend of two or more members, on the condition that the produced near infrared absorbing material is substantially transparent. Optionally, the resin may be used as interposed between two opposed transparent sheets of glass. When the near infrared absorbing material is used for the purpose of high temperature insulation thermal storage, the resin does not need to be transparent. Among other resins mentioned above, polycarbonate resin, (meth)acryl resin, polyester resin, polyethylene resin, polystyrene resin, and polyvinyl chloride resin which excel in weatherability and transparency prove favorable and polycarbonate resin, methacryl resin, polyethyelene phthalate resin, and polyvinyl chloride resin prove particularly preferable. When the material is used as high temperature insulation thermal storage fibers, the polyethylene terephthalte resin or the polyamide resin prove particularly favorable.

In reducing this invention to practice, it is allowable to use such additives as suit the purpose of use. As typical examples of the additives, coloring agent, polymerization adjusting agent, antioxidant, ultraviolet absorbent, flame retardant, plasticizer, rubber for enhancing the resistance to shock, and peeling agent may be cited. In the use of the phthalocyanine compound (1) of this invention, this compound may be used in combination with any of conventional near infrared absorbing agents.

Further in this invention, the method for mixing the aforementioned phthalocyanine compound (1) with a transparent resin and forming the produced mixture in a prescribed shape does not need to be particularly restrricted. It may be accomplished by extrusion molding, injection molding, cast polymerization, press molding, calendar molding, or case film formation, for example.

It is further permissible to manufacture the near infrared absorbing material by forming a film containing the aforementioned phthalocyanine compound (1) and pressing or laminating this film on a transparent resin sheet through the medium of heat. Alternatively, the near infrared absorbing material may be obtained in the form of sheet, film, fibers, or paper by causing a resin ink or printing material containing the phthalocyanine compound to coat a substrate of transparent resin sheet, transparent glass sheet, film, fibers, or paper with the resin ink or coating material by means of printing or coating.

Since the aforementioned phthalocyanine compound (1) excels the commercially available infrared absorbing agent in heat resistance, it can be formed in a prescribed shape with acrylic type resin, polycarbonate resin, or polyethylene terephthalate resin by such a foaming method as injection molding or extrusion molding which elevates the resin temperature to such a high level as 200–350° C. The shaped article so produced, therefore, emits a proper sensation of clarity and excels in the ability to absorb near infrared radiation and the ability to shield heat ray. It is also permissible to produce high temperature insulation thermal storage fibers by spinning the near infrared absorbing material as with polyester resin or polyamide resin at a temperature in the range of 220–350° C. in the shape of fibers. These fibers may be safely used at a temperature lower than 220° C.

The aforementioned near infrared absorbing material does not need to be particularly restricted in shape. Besides the most popular flat sheet or film, various shapes such as corrugated sheet, sphere, and dome are conceivable.

The amount of the aforementioned phthalocyanine compound (1) to be incorporated can be properly selected to suit the transmission through the target sheet or film of the near infrared absorbing material of the light in the range of visible to near infrared radiation and the thickness of the material. It is generally in the range of 0.0005–20 parts by weight, preferably 0.0010–10 parts by weight, based on 100 parts by weight of the resin. Incidentally, this amount is varied by the shape of the near infrared absorbing material. In the manufacture of a near infrared absorbing sheet having a thickness of 3 mm, for example, the amount is preferably in the range of 0.002–0.06 part by weight and more preferably 0.003–0.02 part by weight, based on 100 parts by weight of the resin. Then, in the manufacture of a near infrared absorbing plate having a thickness of 10 mm, the amount is preferably in the range of 0.0005–0.02 part by weight and more preferably 0.001–0.005 part by weight, based on 100 parts by weight of the resin. In the manufacture of a near infrared absorbing film having a thickness of 10 µm, the amount is preferably in the range of 0.1–20 parts by weight and more preferably 0.5–10 parts by weight, based on 100 parts by weight of the resin. To show the amount of phthalocyanine compound to be incorporated without reference to the thickness of the near infrared absorbing material, the amount regarded as the weight in the area projected from above is preferably in the range of 0.01–2.0 g/m$^2$ and more preferably 0.05–1.0 g/m$^2$. If, in this case, the amount of the phthalocyanine compound (1) to be incorporated falls short of 0.01 g/m$^2$, the shortage would result in unduly lowering the effect of near infrared absorption. If this amount exceeds 2.0 g/m$^2$, the excess would possibly boost the cost excessively and decrease the transmission of visible light.

When the near infrared absorbing material of this invention assumes such an irregular shape as a corrugated plate, the amount of the phthalocyanine compound (1) to be incorporated may be regarded as the weight in the area projected from above. It is permissible to use single kind of or two or more kinds of the phthalocyanine compounds (1) in the form of a mixture. The use of such two kinds of phthalocyanine compounds having different absorption wavelength possibly enhance the effect of near infrared absorption. The combined use of the aforementioned phthalocyanine compounds (1a) and (1b) having different maximum absorption wavelengths may be cited as a typical example.

The method for producing the phthalocyanine compound (1) according to the first aspect of this invention does not need to be particularly restricted but may be properly selected from among the known methods. A method which comprises subjecting a given phthalonitrile compound and a metal salt to a reaction of cyclization in a molten state or in an organic solvent and further subjecting the product of cyclization to a reaction with an amino compound is employed preferably.

For example, a phthalonitrile compound represented by the following formula (3) is subjected to a reaction of cyclization with one member selected from the group consisting of metal oxides, metal carbonyls, metal halides, and organic acid metals.

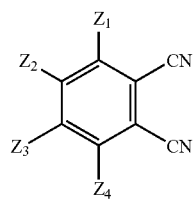

(3)

(wherein $Z_2$ and $Z_3$ independently stand for $SR^1$, $SR^2$, $OR^3$, or a halogen atom, and at least one of them stands for $SR^2$, $Z_1$ and $Z_4$ independently stand for $SR^1$, $SR^2$, $OR^3$, or a halogen atom and any one of them stands for $SR_1$ or a halogen atom and the other thereof stands for $OR^3$, $R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, and $R^3$ stands for a phenyl group optionally having a substituent, an aralkyl group optionally having a substituent, or an alkyl group of 1–20 carbon atoms optionally having a substituent.)

Consequently, a phthalocyanine compound derivative represented by the following formula (4) and possessing no $NH_2R^3$ at the α position is synthesized.

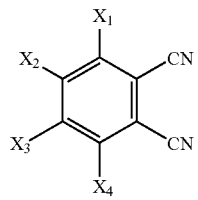

(4)

(wherein $X_1$, $X_2$, $X_3$, and $X_4$ independently stand for a halogen atom).

The phthalocyanine compound contemplated by this invention can be produced by further reacting the phthalocyanine compound derivative with an amino compound of $NHR^4$ and/or $NHR^5$.

This method makes use of the fact that the reactivity of nucleophilic substitution with the amino compound of $NHR^4$ and/or $NHR^5$ decreases in the order of halogen atom and $SR^1$ or $SR^2$, and $OR^3$ manifests no reactivity of nucleophilic substitution. Specifically, by this method, the $SR^1$, $SR^2$, or a halogen atom, especially the halogen atom, at the α position is enabled to undergo the reaction of nucleophilic substitution with the amino compound of $NHR^4$ and/or $NHR^5$ to form a $NHR^4$ group or a $NHR^5$ group and induce efficient introduction of a $NHR^4$ group or the $NHR^5$ group at a prescribed site of the α position of the skeleton of phthalocyanine compound and attain accurate control of the position for insertion of the substituent.

The eighth aspect of this invention is directed toward a method for the production of a phthalocyanine compound set forth in claim 1, which method comprises subjecting a phthalonitrile compound represented by the following formula (3) mentioned above to a reaction of cyclization with one member selected from the group consisting of metal oxides, metal carbonyls, metal halides, and organic acid metals and causing the resultant product of said reaction to react with an amino compound represented by $NHR^4$ and/or $NHR^5$ (wherein $R^4$ stands for a phenyl group optionally possessing a substitute, an aralkyl group optionally having a substituent, or an alkyl group of 1–20 carbon atoms optionally having a substituent and $R^5$ stands for an alkyl group of 1–20 carbon atoms optionally having a substituent) (providing that at least $NHR^5$ is essentially contained).

The symbols $Z_2$, $Z_3$, $Z_6$, $Z_7$, $Z_{10}$, $Z_{11}$, $Z_{14}$, $Z_{15}$, $Z_1$, $Z_4$, $Z_5$, $Z_8$, $Z_9$, $Z_{12}$, $Z_{13}$, and $Z_{16}$ and $R^1$, $R^2$, and $R^3$ have the same definitions as in the phthalocyanine compound (1) of this invention.

In the formula (3), the substituents at the β positions ($Z_2$, $Z_3$, $Z_6$, $Z_7$, $Z_{10}$, $Z_{11}$, $Z_{14}$, and $Z_{15}$) are preferred to stand for independently $SR^1$, $SR^2$, or $OR^3$, particularly $OR^3$, and the substutuents at the α positions ($Z_1$, $Z_4$, $Z_5$, $Z_8$, $Z_9$, $Z_{12}$, $Z_{13}$, and $Z_{16}$) are preferred to stand for independently $SR^1$, $SR^2$, or a halogen atom, particularly a halogen atom.

The phthalonitrile compound of the formula (3) which is the starting material herein can be synthesized by any of the known methods such as, for example the method disclosed in the official gazette of JP-A-64-45474 or may be selected from the commercially available equivalent products. Preferably, it is obtained by reacting a phthalonitrile compound derivative represented by the formula (4) mentioned above with one or more members selected from the group consisting of $HSR^1$, $HSR^2$, and $HOR^3$ (providing that at least one of the members is $HSR^2$). The proportions respectively of $HSR^1$, $HSR^2$, and $HOR^3$ are properly selected, depending on the structure of the phthalonitrile compound aimed at. The total amount of $HSR^1$, $HSR^2$, and/or $HOR^3$ does not need to be particularly restricted but has only to enable the reaction to proceed and eventually produce the phthalonitrile compound aimed at. It is generally in the range of 1.0–6.0 mols and preferably 1.1–2.5 mols, based on 1 mol of phthalonitrile compound derivative.

The phthalonitrile compound mentioned above is obtained by reacting a phthalonitrile compound derivative represented by the formula (4) mentioned above with one or more members selected from the group consisting of $HSR^1$, $HSR^2$, and $HOR^3$ (wherein $R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, and $R^3$ stands for a phenyl group optionally having a substituent, an aralkyl group optionally having a substituent, or an alkyl group of 1–20 carbon atoms optionally having a substituent).

Though the reaction of the phthalonitrile compound derivative with $HSR^1$, $HSR^2$, and/or $HOR^3$ may be carried out in the absence of a solvent or in the presence of an organic solvent. Preferably, it is performed in the presence of an organic solvent. As typical examples of the organic solvent which is usable herein, nitriles such as acetonitrile and benzonitrile and polar solvents such as acetone and 2-butanon may be cited. Among other organic solvents mentioned above, the acetonitrile, benzonitrile, and acetone prove particularly favorable. The amount of the organic solvent to be used at all in the reaction is such that the concentration of the phthalonitrile compound derivative will fall generally in the range of 2–40 (w/v) % and preferably 10–30 (w/v) %. This reaction of the phthalonitrile compound derivative with $HSR^1$, $HSR^2$, and/or $HOR^3$ is preferred to use a trapping agent for the purpose of removing a hydrogen halogenide (such as, for example, hydrogen fluoride) which occurs during the course of the reaction. As typical examples of the trapping agent so used, calcium carbonate, calcium hydroxide, magnesium hydroxide, magnesium chloride, and magnesium carbonate may be cited. Among other trapping agents mentioned above, calcium carbonate and calcium hydroxide prove particularly proper. The amount of the trapping agent which is used at all in the reaction does not need to be particularly restricted but is only required to effect efficient removal of hydrogen halogenides which occurs during the course of the reaction. Generally, it is in the range of 1.0–4.0 mols and preferably 1.1–2.0 mols, based on one mole of the phthalonitrile compound derivative.

The reaction of cyclization is preferred to be effected by reacting a phthalonitrile compound of the formula (3) with one member selected from the group consisting of metals, metal oxides, metal carbonyls, metal halides, and organic acid metals in a molten state or in an organic solvent. The metals, metal oxides, metal carbonyls, metal halides, and organic acid metals which are usable herein (hereinafter referred to collectively as "metal compounds") do not need to be particularly restricted but are only required to obtain the equivalents of M of the aforementioned phthalocyanine compound (1) in consequence of the reaction. As typical examples thereof, the metals such as iron, copper, zinc, vanadium, titanium, indium, and tin enumerated under the item of M in the aforementioned formula (1), such metal halides as chlorides, bromides, and iodines of these metals, such metal oxides as vanadium oxide, titanyl oxide, and copper oxide, organic acid metals such as acetic acid salts, complex compounds such as acetyl acetonate, and metal carbonyls such as iron carbonyl may be cited. Among other examples mentioned above, metals, metal oxides, and metal halides prove particularly favorable.

Though the reaction of cyclization can be carried out in the absence of a solvent, it is preferred to be performed in the presence of an organic solvent. The organic solvent may be any of the inert solvents which have low reactivity with the phthalonitrile compound as the starting material and preferably show no reactivity thereto. As typical examples of the organic solvent, such inert solvents as benzene, toluene, xylene, nitrobenzene, monochlorobenzene, dichloroenzene, trichlorobenzene, 1-chloronaphthalene, 1-methylnaphthalene, ethylene glycol, and benzonitrile and such nonprotonic polar solvents as pyridine, N,N-dimethyl formamide, N-methyl-2-pyrrolidinone, N,N-dimethyl acetophenone, triethyl amine, tri-n-butyl amine, dimethyl sulfoxide, and sulfolane may be cited. Among other organic solvents mentioned above, 1-chloronaphthalene, 1-methylnaphthalene, and benzonitrile prove proper and benzonitrile proves particularly favorable.

The conditions for the reaction of the phthalonitrile compound of the formula (3) with the metal compound do not need to be particularly restricted but are only required to allow the reaction to proceed effectively. For example, the reaction is performed by using the aforementioned phthalonitrile compound in a total amount in the range of 2–40 parts (meaning "parts by weight," the same applies hereinafter), preferably 20–35 parts, based on 100 parts of the organic solvent, charging the reaction system with the metal compound in a proportion in the range of 1–2 mols, preferably 1.1–1.5 mols, based on 4 mols of the phthalonitrile compound, and fixing the reaction temperature in the range of 30–250° C. and preferably 80–200° C. After the reaction, by filtering, washing, and drying the product of this reaction in accordance with the method heretofore adopted in the synthesis of a phthalocyanine compound, it is made possible to obtain a phthalocyanine compound derivative usable in the subsequent step with high efficiency and high purity.

Then, in the method described above, the reaction of the phthalocyanine compound derivative with the amino compound of $NHR^4$ and/or $NHR^5$, when necessary, can be accomplished by mixing these reactants in the presence of an inert liquid having no reactivity with the reactants used in the reaction and heating them to a prescribed temperature. Preferably, it is accomplished by heating the reactants in the amino compound intended for the reaction at a prescribed temperature. As the inert liquid, nitrites such as benzonitrile and acetonitrile and amides such as nitrile, N-methyl pyrrolidone, and dimethyl formamide can be used either singly or in the form of a mixture of two or more members.

In the reaction mentioned above, the reactants are only required to be properly selected in the optimum ranges for enabling the prescribed substituents to be introduced as designed to the positions of substitution of $Z_1$–$Z_{16}$ in the phthalocyanine compound of (1) contemplated by this invention. The following conditions may be adopted for the reaction, for example. Specifically, the amino compound of $NHR^4$ and/or $NHR^5$ is introduced into the reaction system generally in at least an equimolar ratio and preferably in the range of 8–36 mols, based on 1 mol of the phthalocyanine compound derivative obtained by the reaction of cyclization of phthalonitrile compound with a metal compound. Then, the reaction product is charged with a trapping agent, i.e. an inorganic component such as calcium carbonate or calcium hydroxide in a proportion in the range of 1–16 mols, preferably 3–8 mols, based on 1 mol of the phthalocyanine compound derivative for the purpose of trapping the hydrogen halogenide which occurs in the process of the reaction. The trapping agent which is usable herein is the same as that which is used in the reaction of cyclization mentioned above. The reaction temperature used for the reaction of the alkyl amino compound is in the range of 20–200° C. and preferably 30–150° C. and the reaction temperature used for the reaction of aryl amino compound is in the range of 80–250° C. and preferably 100–200° C. After the reaction, by filtering the reaction product to remove the inorganic component and distilling (washing) it to expel the amino compound in accordance with the known method heretofore employed for the synthesis of phthalocyanine compound by the reaction of substitution, it is made possible to obtain the phthalocyanine compound contemplated by this invention with high efficiency and high purity without involving any complicated process of production.

EXAMPLES

Now, working examples and comparative examples will be described below. The maximum absorption wavelengths (λmax) reported in this invention are magnitudes determined in acetone.

(Measurement of Spectral Transmittance)

A given test piece was tested for transmittance at emission wavelengths of particularly high emission intensity, 830 nm, 880 nm, 920 nm, and 980 nm, among other emission wavelengths of xenon from plasma display by the use of a spectrophotometer (made by Shimadzu Seisakusho Ltd. and sold under the trademark designation of "UV-3100"). It was also tested for average transmittance, T, in the part of visible light ranging from 400 nm through 700 nm.

(Evaluation of Moisture-Proofness)

A given test piece was tested for varying transmittances after the elapse of 1000 hours under the conditions of 60° C.

in temperature and 90% in humidity by the use of an air conditioned room (made by TABAI and sold under the trademark designation of "PLATINOUS LUCIFER PL-3G"). The amounts of variation were rated on the three-point scale, wherein ⊚ stands for a variation falling short of 2%, ○ for a variation in the range of 2–4%, and X for a variation exceeding 4%.

(Evaluation of Heat Resistance)

A given test piece was tested for varying transmittances after the elapse of 1000 hours under the condition of 80° C. in temperature by the use of an inert oven (made by TABAI and sold under the trademark designation of "INERT OVEN IPHH-200"). The amounts of variation were rated on the three-point scale, wherein ⊚ stands for a variation falling short of 2%, ○ for a variation in the range of 2–4%, and X for a variation exceeding 4%.

(Evaluation of Light Resistance)

A given test piece was tested for varying transmittances after the elapse of 500 hours by the use of a light resistance tester (made by Shimadzu Seisakusho Ltd. and sold under the trademark designation of "SUNTESGTER XF-180CPS"). The amounts of variation were rated on the three-point scale, wherein ⊚ stands for a variation falling short of 2%, ○ for a variation in the range of 2–4%, and X for a variation exceeding 4%. The light was projected from the ultraviolet absorbing layer side.

Synthesis Example 1

Synthesis of 3-(2,6-dimethylphenoxy)-4,5-bis(phenylthio)-6-fluorophthalonitrile

A 500-ml four-neck separable flask was charged with 60 g (0.30 mol) of tetrafluorophthalonitrile, 41.8 g (0.72 mol) of potassium fluoride, and 160 ml of acetonitrile and further a dopping funnel was charged with 66.1 g (0.60 mol) of thiophenol. The contents of the flask were continuously stirred for about 8 hours after the thiophenol from the dropping funnel was added dropwise to the reactants in the flask at a speed so adjusted as to keep the reaction temperature below 40° C.

Then, the flask was charged with 40.3 g (0.33 mol) of 2,6-dimethylphenol, 20.9 g (0.36 mol) of potassium fluoride, and 40 ml of acetonitrile. The contents of this flask were continuously stirred as refluxed for eight hours. The flask with its contents was cooled and the reaction solution therein was filtered. The residue of filtration was washed with 600 ml of acetonirrile, filtered, and combined with the filtrate. The combined filtrate was distilled by the use of a rotary evaporator to expel acetonitrile by evaporation. The residue of the distillation was combined with methanol and recrystallized. The crystals consequently obtained were filtered and vacuum dried to obtain 113.8 g (yield: 78.6 mol %) of 3-(2,6-dimethylphenoxy)-4,5-bis(phenylthio)-6-fluorophthalonitrile was obtained.

TABLE 1

| Elementary analyses | C (%) | H (%) | N (%) | F (%) | S (%) |
|---|---|---|---|---|---|
| Theoretical | 69.69 | 3.97 | 5.80 | 3.94 | 13.29 |
| Found | 69.62 | 4.01 | 5.83 | 3.97 | 13.26 |

Synthesis Example 2

Synthesis of 3-(2,6-dimethylphenoxy)-4,5-bis(2-methoxyphenylthio)-6-fluorophthalonitrile By following the procedure of Synthesis Example 1 while using 84.1 g (0.60 mol) of 2-methoxythiophenol in place of 33.0 g (0.60 mol) of thiophenol, 138.6 g (yield: 85.2 mol %) of 3-(2,6-dimethylphenoxy)-4,5-bis(2-methoxyphenylthio)-6-fluorophthalonitrile was obtained.

TABLE 2

| Elementary analyses | C (%) | H (%) | N (%) | F (%) | S (%) |
|---|---|---|---|---|---|
| Theoretical | 66.40 | 4.27 | 5.16 | 3.50 | 11.82 |
| Found | 66.11 | 4.33 | 5.28 | 3.38 | 11.65 |

Synthesis Example 3

Synthesis of 3-(2,6-dimethylphenoxy)-4,5-bis(4-methoxyphenylthio)-6-fluorophthalonitrile By following the procedure of Synthesis Example 1 while using 84.1 g (0.60 mol) of 4-methoxythiophenol in place of 33.0 g (0.60 mol) of thiophenol, 141.7 g (yield: 87.1 mol %) of 3-(2,6-dimethylphenoxy)-4,5-bis(4-methoxyphenylthio)-6-fluorophthalonitrile was obtained.

TABLE 3

| Elementary analyses | C (%) | H (%) | N (%) | F (%) | S (%) |
|---|---|---|---|---|---|
| Theoretical | 66.40 | 4.27 | 5.16 | 3.50 | 11.82 |
| Found | 66.81 | 4.05 | 5.30 | 3.33 | 12.05 |

Example 1

Synthesis of VOPc(PhS)$_8${2,6-(CH$_3$)$_2$PhO}$_4${(C$_2$H$_5$)$_2$NCH$_2$CH$_2$NH}$_4$ A 100-ml four-neck flask was charged with 10 g (20.7 m.mols) of 3-(2,6-dimethylphenoxy)-4,5-bis(phenylthio)-6-fluorophthalonitrile, 0.978 g (6.22 m.mols) of vanadium trichloride, 0.81 g of octanol, and 14.19 g of benzonitrile. Then, the contents of the flask were continuously stirred as refluxed for about four hours. Thereafter, the mixture in the flask and 30 g of benzonitrile added thereto were cooled together to 60° C. and the produced mixture and 14.45 g (124 m.mols) of N,N-diethylethylene diamine added thereto were together stirred continuously at 60°C for about six hours. The stirred mixture was cooled and the reaction solution in the flask was filtered. The filtrate was added dropwise into a mixed solution of acetonitrile and water, allowed to precipitate crystals, and further washed with a mixed solution of acetonitrile and water. By vacuum drying, 7.79 g of VOPc(PhS)$_8${2,6-(CH$_3$)$_2$PhO}$_4${(C$_2$H$_5$)$_2$NCH$_2$CH$_2$NH}$_4$ {yield: 63.2 mol % based on {3-(2,6-dimethylphenoxy)-4,5-bis(phenylthio)-6-fluorophthalonitrile} was obtained.

TABLE 4

| Elementary analyses | C (%) | H (%) | N (%) | O (%) | S (%) |
|---|---|---|---|---|---|
| Theoretical | 68.57 | 5.75 | 9.41 | 3.36 | 10.77 |
| Found | 68.59 | 5.78 | 9.38 | 3.32 | 10.81 |

The phthalocyanine compound obtained in the present example, i.e. VOPc(PhS)$_8${2,6-(CH$_3$)$_2$PhO}$_4${(C$_2$H$_5$)$_2$NCH$_2$CH$_2$NH}$_4$, was tested for maximum absorption wavelengths in acetone and in chloroform by the use of a spectrophotometer (made by Shimadzu Seisakusho Ltd. and sold under the trademark designation of "UV1-3100").

This phthalocyanine compound was diluted with chloroform till the minimum transmittance exceeding 920 nm and not exceeding 1050 nm as determined in a 1-cm quartz cell reached a level in the range of 5–6%. The diluted phthalocyanine compound was tested for transmittance with a spectrophotometer. The transmittance to visible light was calculated by the standard of JIS (Japanese Industrial Standard) R3106 (1985) with necessary modifications.

The maximum amount of the phthalocyanine compound to be dissolved at the end, i.e., the concentration (solubility) of phthalocyanine compound as a solute in the saturated solution, was determined by visually monitoring a solution state while dissolving the phthalocyanine compound each in toluene and in methyl ethyl ketone (MEK) (both 10 ml in volume) at a room temperature (25° C.).

These test results are shown in Table 23 below. The solubility shown in Table 23 represents the data obtained by rating the relevant values on the three-point scale, wherein ⊙ stands for a value of not less than 5% by weight, ○ for a value of not less than 1% by weight and less than 5% by weight, Δ for a value of not less than 0.1% by weight and less than 1% by weight, and X for a value of less than 0.1% by weight.

Example 2

Synthesis of VoPc{2-(CH$_2$O)PhS}$_8${2,6-(CH$_3$)$_2$PhO}$_4${(C$_2$H$_5$)$_2$NCH$_2$CH$_2$NH}$_4$ By following the procedure of Example 1 while using 11.23 g (20.7 m.mols) of 3-(2,6-dimethylphenoxy)-4,5-bis(2-methoxyphenylthio)-6-fluorophthalonitrile in place of 10 g of 3-(2,6-dimethylphenoxy)-4,5-bis(phenylthio)-6-fluorophthalonitrile, 8.06 g (yield: 59.4 mol % based on 3-(2,6-dimethylphenoxy)-4,5-bis(2-methoxyphenylthio)-6-fluorophthalonitrile) of VOPc{2-(CH$_2$O)PhS}$_8${2,6-(CH$_3$)$_2$PhO}$_4${(C$_2$H$_5$)$_2$NCH$_2$CH$_2$NH}$_4$ was obtained.

TABLE 5

| Elementary analyses | C (%) | H (%) | N (%) | O (%) | S (%) |
|---|---|---|---|---|---|
| Theoretical | 65.96 | 5.84 | 8.55 | 7.93 | 9.78 |
| Found | 65.99 | 5.88 | 8.54 | 7.90 | 9.77 |

The phthalocyanine compound consequently obtained was tested for maximum absorption wavelength, transmittance to visible light, and solubility in the same manner as in Example 1. The results of the test are shown in Table 23 below.

Example 3

Synthesis of VOPc(PhS)$_8${2,6-(CH$_3$)$_2$PhO}$_4$[{(CH$_3$)$_2$NCH$_2$CH$_2$NH}]$_4$ By following the procedure of Example 1 while using 17.92 g (124 m.mols) of N,N-diisopropylethylene diamine in place of 14.45 g of diethylethylene diamine, 7.98 g (the yield: 61.8 mol % based on 3-(2,6-dimethylphenoxy)-4,5-bis(phenylthio)-6-fluorophthalonitrile) of VOPc(PhS)$_8${2,6-(CH$_3$)$_2$PhO}$_4$[{(CH$_3$)$_2$CH}$_2$NCH$_2$CH$_2$NH]$_4$ was obtained.

TABLE 6

| Elementary analyses | C (%) | H (%) | N (%) | O (%) | S (%) |
|---|---|---|---|---|---|
| Theoretical | 69.34 | 6.14 | 8.98 | 3.21 | 10.28 |
| Found | 69.39 | 6.16 | 8.95 | 3.19 | 10.25 |

The phthalocyanine compound consequently obtained was tested for maximum absorption wavelength, transmittance to visible light, and solubility in the same manner as in Example 1. The results of the test are shown in Table 23 below.

Example 4

Synthesis of VOPc(PhS)$_8${2,6-(CH$_3$)$_2$PhO}$_4$[{CH$_3$(CH$_2$)$_2$CH}$_2$NCH$_2$CH$_2$NH]$_4$ By following the procedure of Example 1 while using 21.4 g (124 m.mols) of N,N-di-n-butylethylene diamine in place of 14.45 g of N,N-diethylethylene diamine, 7.89 g (yield: 58.5 mol % based on 3-(2,6-dimethylphenoxy)4,5-bis(phenylthio)-6-fluorophthalonitrile) of VOPc(PhS)$_8${2,6-(CH$_3$)$_2$PhO}$_4$[{CH$_3$(CH$_2$)$_2$CH}$_2$NCH$_2$CH$_2$NH}]$_4$ was obtained.

TABLE 7

| Elementary analyses | C (%) | H (%) | N (%) | O (%) | S (%) |
|---|---|---|---|---|---|
| Theoretical | 70.04 | 6.50 | 8.60 | 3.07 | 9.84 |
| Found | 70.10 | 6.49 | 8.58 | 3.10 | 9.87 |

The phthalocyanine compound consequently obtained was tested for maximum absorption wavelength, transmittance to visible light, and solubility in the same manner as in Example 1. The results of the test are shown in Table 23 below.

Example 5

Synthesis of

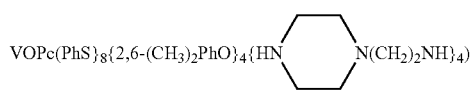

By following the procedure of Example 1 while using 16.05 g (124 m.mols) of 1-(2-aminoethyl) piperazine in place of 14.45 g of N,N-diethylethylene diamine, 7.22 g (the yield: 57.3 mol % based on 3-(2,6-dimethylphenoxy)-4,5-bis(phenythio)-6-fluorophthalonitrile) of

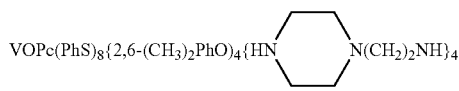

was obtained.

TABLE 8

| Elementary analyses | C (%) | H (%) | N (%) | O (%) | S (%) |
|---|---|---|---|---|---|
| Theoretical | 67.11 | 5.47 | 11.51 | 3.29 | 10.54 |
| Found | 67.14 | 5.47 | 11.48 | 3.25 | 10.55 |

The phthalocyanine compound consequently obtained was tested for maximum absorption wavelength, transmittance to visible light, and solubility in the same manner as in Example 1. The results of the test are shown in Table 23 below.

Example 6

Synthesis of

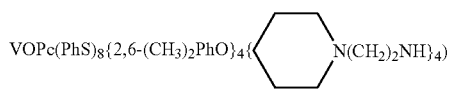

By following the procedure of Example 1 while using 15.92 g (124 m.mols) of 1-(2-aminoethyl) piperidine in place of 14.45 g of N,N-diethylene diamine, 7.37 g (yield: 58.6 mol % based on 3-(2,6-dimethylphenoxy)-4,5-bis(phenylthio)-6-fluorophthalonitrile) of

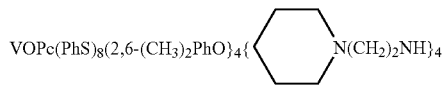

was obtained.

TABLE 9

| Elementary analyses | C (%) | H (%) | N (%) | O (%) | S (%) |
|---|---|---|---|---|---|
| Theoretical | 69.19 | 5.64 | 9.22 | 3.29 | 10.56 |
| Found | 69.25 | 5.60 | 9.20 | 3.31 | 10.49 |

The phthalocyanine compound consequently obtained was tested for maximum absorption wavelength, transmittance to visible light, and solubility in the same manner as in Example 1. The results of the test are shown in Table 23 below.

Example 7

Synthesis of

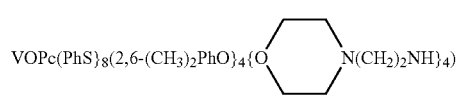

By following the procedure of Example 1 while using 16.17 g (124 m.mols) of 1-(2-aminoethyl)morpholine in place of 14.45 g of N,N-diethylethylene diamine, 7.65 g (yield: 60.6 mol % based on 3-(2,6-dimethylphenoxy)-4,5-bis(phenylthio)-6-fluorophthalonitrile) of

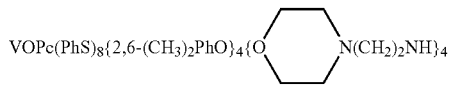

was obtained.

TABLE 10

| Elementary analyses | C (%) | H (%) | N (%) | O (%) | S (%) |
|---|---|---|---|---|---|
| Theoretical | 67.00 | 5.29 | 9.19 | 5.91 | 10.52 |
| Found | 67.07 | 5.34 | 9.12 | 5.88 | 10.55 |

Example 8

Synthesis of VOPc(PhS)$_8${2,6-(CH$_3$)$_2$PhO}$_4$ {(CH$_3$CH$_2$O(CH$_2$)$_3$NH}$_4$ By following the procedure of Example 1 while using 12.81 g (124 m.mols) of 3-ethoxypropyl amine in place of 14.45 g of N,N-diethylethylenediamine, 7.70 g (yield: 63.9 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${(CH$_3$CH$_2$O(CH$_2$)$_3$NH)$_4$ was obtained.

TABLE 11

| Elementary analyses | C (%) | H (%) | N (%) | O (%) | S (%) |
|---|---|---|---|---|---|
| Theoretical | 68.05 | 5.36 | 7.21 | 6.18 | 11.01 |
| Found | 68.10 | 5.35 | 7.17 | 6.15 | 10.98 |

The phthalocyanine compound consequently obtained was tested for maximum absorption wavelength, transmittance to visible light, and solubility in the same manner as in Example 1. The results of the test are shown in Table 23 below.

Example 9

Synthesis of VOPc(PhS)$_8${2,6-(CH$_3$)$_2$PhO}$_4${(CH$_3$)$_2$CHO(CH$_2$)$_3$NH}$_4$ By following the procedure of Example 1 while using 14.55 g (124 m.mols) of 3-isopropoxypropyl amine in place of 14.45 g of N,N-diethylethylene diamine, 7.83 g (yield: 63.4 mol % based on 3-(2,6-dimethylplhenoxy)-4,5-bis(phenylthoio)-6-fluorophthalonitrile) of VOPc {PhS}$_8${2,6-(CH$_3$)$_2$PhO}$_4${(CH$_3$)$_2$CHO(CH$_2$)$_3$NH}$_4$ was obtained.

TABLE 12

| Elementary analyses | C (%) | H (%) | N (%) | O (%) | S (%) |
|---|---|---|---|---|---|
| Theoretical | 68.46 | 5.58 | 7.04 | 6.03 | 10.75 |
| Found | 68.51 | 5.55 | 7.01 | 5.97 | 10.81 |

Example 10

Synthesis of VOPc(PhS)$_8${2,6-(CH$_3$)$_2$PhO}$_4${CH$_3$(CH$_2$)$_3$O(CH$_2$)$_3$NH}$_4$ By following the procedure of Example 1 while using 16.30 g (124 m.mols) of 3-butoxypropyl amine in place of 14.45 g of N,N-diethylethylenediamine, 7.92 g (yield: 62.7 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$(CH$_2$)$_3$O(CH$_2$)$_3$NH}$_4$ was obtained.

TABLE 13

| Elementary analyses | C (%) | H (%) | N (%) | O (%) | S (%) |
|---|---|---|---|---|---|
| Theoretical | 68.85 | 5.78 | 6.88 | 5.90 | 10.50 |
| Found | 68.88 | 5.72 | 6.92 | 5.84 | 10.58 |

The phthalocyanine compound consequently obtained was tested for maximum absorption wavelength, transmittance to visible light, and solubility in the same manner as in Example 1. The results of the test are shown in Table 23 below.

Example 11

Synthesis of VOPc(PhS)$_8${2,6-(CH$_3$)$_2$PhO}$_4${CH$_3$(CH$_2$)$_3$CH(C$_2$H$_5$)CH$_2$O(CH$_2$)$_3$NH}$_4$ By following the procedure of Example 1 while using 23.27 g (124 m.mols) of 3-(2-ethyl-hexyloxy)propyl amine in place of 14.45 g of N,N-diethylethylene diamine, 8.43 g (yield: 61.1 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$(CH$_2$)$_3$CH(C$_2$H$_5$)CH$_2$O(CH$_2$)$_3$NH}$_4$ was obtained.

TABLE 14

| Elementary analyses | C (%) | H (%) | N (%) | O (%) | S (%) |
|---|---|---|---|---|---|
| Theoretical | 70.27 | 6.50 | 6.30 | 5.40 | 9.62 |
| Found | 70.31 | 6.47 | 6.24 | 5.35 | 9.58 |

The phthalocyanine compound consequently obtained was tested for maximum absorption wavelength, transmittance to visible light, and solubility in the same manner as in Example 1. The results of the test are shown in Table 23 below.

Example 12

Synthesis of VOPc(PhS)B{2,6-(CH$_3$)$_2$PhO}$_4${CH$_3$CH$_2$C(CH$_3$)$_2$NH}$_4$ By following the procedure of Example 1 while using 10.83 g (124 m.mols) of 1,2-dimethylpropyl amine in place of 14.45 g of N,N-diethylethylene diamine, 7.56 g (yield: 64.5 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$CH$_2$C(CH$_3$)$_2$NH}$_4$ was obtained.

TABLE 15

| Elementary analyses | C (%) | H (%) | N (%) | O (%) | S (%) |
|---|---|---|---|---|---|
| Theoretical | 69.97 | 5.52 | 7.24 | 3.53 | 11.32 |
| Found | 70.03 | 5.49 | 7.20 | 3.56 | 11.37 |

Example 13

Synthesis of VOPc(PhS)$_8${2,6-(CH$_3$)$_2$PhO}$_4$(C$_6$H$_{11}$NH)$_4$

By following the procedure of Example 1 while using 12.32 g (124 m.mols) of cyclohexyl amine in place of 14.45 g of N,N-diethylethylene diamine, 7.08 g (yield: 59.1 mol % based on 3-(2,6-dimethylphenoxy)-4,5-bis(phenylthio)-6-fluorophthalonitrile) of VOPc(PhS)$_8${2,6-(CH$_3$)$_2$-PhO}$_4$(C$_6$H$_{11}$NH)$_4$ was obtained.

TABLE 16

| Elementary analyses | C (%) | H (%) | N (%) | O (%) | S (%) |
|---|---|---|---|---|---|
| Theoretical | 70.59 | 5.40 | 7.26 | 3.46 | 11.09 |
| Found | 70.67 | 5.36 | 7.20 | 3.41 | 11.13 |

Example 14

Synthesis of VOPc(PhS)$_8${2,6-(CH$_3$)$_2$PhO}$_4${CH$_3$(CH$_2$)$_4$CH(CH$_3$)NH}$_4$ By following the procedure of Example 1 while using 14.31 g (124 m.mols) of 2-heptyl amine in place of 14.45 g of N,N-diethylethylene amine, 7.96 g (yield: 64.7 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$(CH$_2$)$_4$CH(CH$_3$)NH}$_4$ was obtained.

TABLE 17

| Elementary analyses | C (%) | H (%) | N (%) | O (%) | S (%) |
|---|---|---|---|---|---|
| Theoretical | 70.71 | 5.93 | 7.07 | 3.36 | 10.79 |
| Found | 70.77 | 5.90 | 7.01 | 3.40 | 10.85 |

Example 15

Synthesis of VOPc(PhS)$_8${2,6-(CH$_3$)$_2$PhO}$_4${(CH$_3$)$_5$NH}$_4$

By following the procedure of Example 1 while using 12.57 g (124 m.mols) of n-hexyl amine in place of 14.45 g of N,N-diethylene diamine, 7.83 g (yield: 65.2 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${(CH$_3$)$_5$NH}$_4$ was obtained.

TABLE 18

| Elementary analyses | C (%) | H (%) | N (%) | O (%) | S (%) |
|---|---|---|---|---|---|
| Theoretical | 70.35 | 5.73 | 7.24 | 3.45 | 11.05 |
| Found | 70.41 | 5.69 | 7.29 | 3.40 | 11.11 |

The phthalocyanine compound consequently obtained was tested for maximum absorption wavelength, transmittance to visible light, and solubility in the same manner as in Example 1. The results of the test are shown in Table 23 below.

Example 16

Synthesis of VOPc(PhS)$_8${2,6-(CH$_3$)$_2$PhO}$_4${CH$_3$(CH$_2$)$_3$CH(C$_2$H$_5$)CH$_2$NH}$_4$ By following the procedure of Example 1 while using 16.05 g of (124 m.mols) of 2-ethylhexyl amine in place of 14.45 g of N,N-diehylethylene diamine, 8.10 g (yield: 64.3 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$(CH$_2$)$_3$CH(C$_2$H$_5$)CH$_2$NH}$_4$ was obtained.

TABLE 19

| Elementary analyses | C (%) | H (%) | N (%) | O (%) | S (%) |
|---|---|---|---|---|---|
| Theoretical | 71.05 | 6.13 | 6.90 | 3.29 | 10.54 |
| Found | 71.11 | 6.10 | 6.82 | 3.22 | 10.60 |

The phthalocyanine compound consequently obtained was tested for maximum absorption wavelength, transmittance to visible light, and solubility in the same manner as in Example 1. The results of the test are shown in Table 23 below.

Example 17

Synthesis of VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$ By following the procedure of Example 1 while using 11.23 g (20.7 m.mols) of 3-(2,6-dimethylphenoxy)-4,5-bis(4-mehoxyphenylthio)-6-fluorophthalonitrile in place of 10 g of 3-(2,6-dimethylphenoxy)-4,5-bis(phenylthio)-6-fluorophthalonitrile and 16.05 g (124 m.mols) of 2-ethylhexyl amine in place of 14.45 g of N,N-diethylethylene diamine, 9.18 g (yield: 66.3 mol % based on 3-(2,6-dimethylphenoxy)-4,5-bis(4-methoxyphenylthio)-6-fluorophthalonitrile) of VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$ was obtained.

TABLE 20

| Elementary analyses | C (%) | H (%) | N (%) | O (%) | S (%) |
|---|---|---|---|---|---|
| Theoretical | 68.26 | 6.18 | 6.28 | 7.78 | 9.59 |
| Found | 68.32 | 6.15 | 6.21 | 7.80 | 9.64 |

The phthalocyanine compound consequently obtained was tested for maximum absorption wavelength, transmittance to visible light, and solubility in the same manner as in Example 1. The results of the test are shown in Table 23 below.

Example 18

Synthesis of VOPc(PhS)$_8${2,6-(CH$_3$)$_2$PhO}$_4${CH$_3$(CH$_2$)$_7$NH}$_4$

By following the procedure of Example 1 while using 16.05 g (124 m.mols) of n-octyl amine in place of 14.45 g N,N-diethylethylene amine, 8.01 g (yield: 63.6 mol % based on 3-(2,6-dimethylphenoxy)-4,5-bis(phenylthio)-6-fluorophthalonitrile) of VOPc{PhS}$_8${2,6-(CH$_3$)$_2$PhO}$_4$ {CH$_3$(CH$_2$)$_7$NH}$_4$ was obtained.

TABLE 21

| Elementary analyses | C (%) | H (%) | N (%) | O (%) | S (%) |
|---|---|---|---|---|---|
| Theoretical | 71.05 | 6.13 | 6.90 | 3.29 | 10.54 |
| Found | 71.12 | 6.05 | 6.83 | 3.33 | 10.59 |

The phthalocyanine compound consequently obtained was tested for maximum absorption wavelength, transmittance to visible light, and solubility in the same manner as in Example 1. The results of the test are shown in Table 23 below.

Example 19

Synthesis of VOPc(PhS)$_8${2,6-(CH$_3$)$_2$PhO}$_4${CH$_3$(CH$_2$)$_{17}$NH}$_4$ By following the procedure of Example 1 while using 33.47 g (124 m.mols) of n-octadecyl amine in place of 14.45 g of N,N-diethylethylene diamine, 9.13 g (yield: 58.9 mol % based on 3-(2,6-dimethylphenoxy)-4,5-bis(phenylthio)-6-fluorophthalonitrile) of VOPc(PhS)$_8${2,6-(CH$_3$)$_2$PhO}$_4${CH$_3$(CH$_2$)$_{17}$NH}$_4$ was obtained.

TABLE 22

| Elementary analyses | C (%) | H (%) | N (%) | O (%) | S (%) |
|---|---|---|---|---|---|
| Theoretical | 73.78 | 7.67 | 5.61 | 2.67 | 8.56 |
| Found | 73.82 | 7.64 | 5.56 | 2.64 | 8.62 |

The phthalocyanine compound consequently obtained was tested for maximum absorption wavelength, transmittance to visible light, and solubility in the same manner as in Example 1. The results of the test are shown in Table 23 below.

TABLE 23

| Example | Abbreviation of phthalocyanine compound | Max. absorption wavelength (in acetone) | Max. absorption wavelength (in chloroform) | Solubility toluene | Solubility MEX | Transmittance to visible light (%) |
|---|---|---|---|---|---|---|
| 1 | VOPc(PhS)$_8${2,6-(CH$_3$)$_2$PhO}$_4$ {(C$_2$H$_5$)$_2$NCH$_2$CH$_2$NH}$_4$ | 941 nm | 960 nm | ◎ | ◎ | 78 |
| 2 | VOPc{2-(CH$_3$O)PhS}$_8${2,6-(CH$_3$)$_2$PhO}$_4${(C$_2$H$_5$)$_2$NCH$_2$CH$_2$NH}$_4$ | 950 nm | 970 nm | ◎ | ◎ | 77 |
| 3 | VOPc(PhS)$_8${2,6-(CH$_3$)$_2$PhO}$_4$ [{(CH$_3$)$_2$CH}$_2$NCH$_2$CH$_2$NH]]$_4$ | 952 nm | 970 nm | ◎ | ◎ | 76 |
| 4 | VOPc(PhS)$_8${2,6-(CH$_3$)$_2$PhO}$_4$ [{CH$_3$(CH$_2$)$_2$CH}$_2$NCH$_2$CH$_2$NH]]$_4$ | 944 nm | 963 nm | ◎ | ◎ | 76 |
| 5 | VOPc(PhS)$_8${2,6-(CH$_3$)$_2$PhO}$_4$ 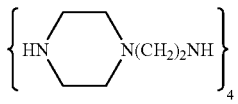 | 923 nm | 942 nm | ◎ | ◎ | 78 |
| 6 | VOPc(PhS)$_8${2,6-(CH$_3$)$_2$PhO}$_4$ 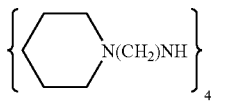 | 922 nm | 941 nm | ◎ | ◎ | 79 |
| 8 | VOPc(PhS)$_8${2,6-(CH$_3$)$_2$PhO}$_4$ {(CH$_3$CH$_2$O(CH$_2$)$_3$NH}$_4$ | 928 nm | 947 nm | ◎ | ◎ | 76 |
| 9 | VOPc(PhS)$_8${2,6-(CH$_3$)$_2$PhO}$_4$ {(CH$_3$)$_2$CHO(CH$_2$)$_3$NH}4 | 930 nm | 949 nm | ◎ | ◎ | 78 |
| 10 | VOPc(PhS)$_8${2,6-(CH$_3$)$_2$PhO}$_4$ {CH$_3$(CH$_2$)$_3$O(CH$_2$)$_3$NH}4 | 930 nm | 950 nm | ◎ | ◎ | 77 |
| 11 | VOPc(PhS)$_8${2,6-(CH$_3$)$_2$PhO}$_4$ {CH$_3$(CH$_2$)$_3$CH(C$_2$H$_5$)CH$_2$O(CH$_2$)$_3$NH}$_4$ | 933 nm | 952 nm | ◎ | ◎ | 75 |
| 15 | VOPc(PhS)$_8${2,6-(CH$_3$)$_2$PhO}$_4$ {CH$_3$(CH$_2$)$_5$NH}$_4$ | 930 nm | 948 nm | ◎ | ◎ | 80 |
| 16 | VOPc(PhS)$_8${2,6-(CH$_3$)$_2$PhO}$_4$ {CH$_3$(CH$_2$)$_3$CH(C$_2$H$_5$)CH$_2$NH}$_4$ | 939 nm | 958 nm | ◎ | ◎ | 79 |
| 17 | VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$ | 960 nm | 980 nm | ◎ | ◎ | 80 |
| 18 | VOPc(PhS)$_8${2,6-(CH$_3$)$_2$PhO}$_4$ {CH$_3$(CH$_2$)$_7$NH}$_4$ | 931 nm | 950 nm | ◎ | ◎ | 79 |
| 19 | VOPc(PhS)$_8${2,6-(CH$_3$)$_2$PhO}$_4$ {CH$_3$(CH$_2$)$_{17}$NH}$_4$ | 935 nm | 954 nm | ◎ | ◎ | 78 |

Example 20

A lens 75 mm in outside diameter and 2 mm in thickness at the center was produced by adding 100 parts by weight of molten polycarbonate resin (made by Teijin Chemical Co., Ltd. and sold under the trademark designation of "Panlite 1285") and 0.012 part by weight of the phthalocyanine obtained in Example 1 [VOPc(PhS)$_8${2,6-(CH$_3$)$_2$PhO}$_4${(C$_2$H$_5$)$_2$NCH$_2$CH$_2$NH}$_4$] together and forming the resultant mixture with an injection molding machine adjusted in advance to a temperature in the range of 250–300° C.

At the central part of the produced lens, the transmittance of a light beam of 950 nm was 10.2% and the transmittance to visible light was 75%.

When a laser cutter using this lens was tried by a panel of visionary experts, it exerted neither stimulus nor sensation of fatigue on the panel members and induced no hindrance of any sort in the recognition of an object in the field of vision.

Example 21

A filter was produced by adding 100 parts by weight of molten polycarbonate resin (made by Teijin Chemical Co., Ltd. and sold under the trademark designation of "Panlite 1285"), 0.006 part by weight of the phthalocyanine [VOPc(2,5-Cl$_2$PhO)$_4$(2,6-(CH$_3$)$_2$PhO)$_4${Ph(CH$_3$)CHNH}$_3$F] obtained in Example 3 reported in the official gazette of JP-A-2001-106689 and 0.0100 part by weight of the phthalocyanine [VOPc(PhS)$_8${2,6-(CH$_3$)$_2$PhO}$_4${(C$_2$H$_5$)$_2$NCH$_2$CH$_2$NH}4] obtained in Example 1 together and forming the resultant mixture with a T-die extruding machine into a sheet 2.5 mm in thickness at 280° C.

Through this filter, the transmittance of light beam 750–1,100 nm in wavelength was found to have the minimum value of 9.5% and the transmittance to visible light to be 67.3%.

The filter was actually mounted on the front surface part of a plasma display and equipped with an electronic device for remote control of the plasma display disposed at a position of 2.5 m from the display. Then, this plasma display was tested to determine whether or not the display induced a malfunction, to find that the plasma display induced a malfunction in the absence of the filter and showed absolutely no sign of induction of a malfunction in the presence of the filter.

Example 22

A filter film was produced in a thickness of 0.1 mm by adding 100 parts by weight of molten polyethylene terephthalate, 0.070 part by weight of the phthalocyanine compound {VOPc(2,5-Cl$_2$PhO)$_8$(2,6-(CH$_3$)$_2$-PhO)$_4$ {PhCH$_2$NH}$_4$} obtained in the same manner as in Example 7 reported in the official gazette of JP-A-2001-106689, and 0.10 part by weight of VOPc(PhS)$_8$ {2,6-(CH$_3$)$_2$PhO}$_4$ { (C$_2$H$_5$)$_2$NCH$_2$CH$_2$NH}$_4$ obtained in Example 1 together and forming the resultant mixture with an extruding machine and a film forming machine at a forming temperature of 280° C. Through the produced filter, the average transmittance of light beam 800–950 nm in wavelength was 9.4% and the transmittance to visible light was 68.7%.

When the filter film was applied to the front surface part of a plasma display and examined in the same manner as in Example 20 to determine whether or not it induced a malfunction, absolutely no sign of a malfunction was detected when the filter film was applied to the plasma display.

Example 23

A transparent coating film containing a near infrared absorbing agent was obtained by melting and mixing 10 parts by weight of a commercially available fluorene type polyester copolymer, 0.1 part by weight of the phthalocyanine [CuPc(2,5-Cl$_2$PhO)$_8$ {2,6-(CH$_3$)$_2$PhO}$_4$ (PhCH$_2$NH)$_4$] (λmax 807 nm) obtained in Example 8 reported in the official gazette of JP-A-2001-106689, 0.13 part by weight of the phthalocyanine [VOPc(2,5-Cl$_2$PhO)$_8$ {2,6-(CH$_3$)$_2$PhO}$_4$ (PhCH$_2$—NH)$_4$] (λmax 870 nm) obtained in Example 7, 0.09 part by weight of the phthalocyanine [VOPc(PhS)$_8${2, 6-(CH$_3$)$_2$PhO}$_4$(PhCH$_2$NH)$_4$] (λmax 912) obtained in Example 9, and 0.15 part by weight of the phthalocyanine [VOPc{4-(CH$_3$O)PhS}$_8${2,6-(CH$_3$)$_2$PhO}$_4${CH$_3$(CH$_2$)$_3$CH (C$_2$H$_5$)CH$_2$NH}$_4$] (λmax 962 nm) obtained in Example 17 reported in the official gazette of JP-A-2002-171738 in 89.53 parts by weight of dichloromethane thereby preparing a resin coating liquid, applying this resin coating liquid to a commercially available polyethylene terephthalate film (about 50 µm in thickness) in such an amount as to give a dry film thickness of 10 µm, drying the coated film at room temperature, and further drying it at 80° C.

Then, a transparent viscous layer containing an ultraviolet absorbing agent was superposed on the coating layer of this transparent coating film by applying to the coating layer a mixture prepared by mixing 2.7 parts by weight of the ultraviolet absorbing agent (made by Ciba Specialty Chemicals Ltd. and sold under the trademark designation of "TINUVIN 384"), 0.9 part by weight of an antioxicant (made by Ciba Specialty Chemcals Ltd. and sold under the trademark designation of "IRGANOX-1010"), and 96.4 parts by weight of an acrylic type adhesive agent (made by Toa Gosei Chemical Co., Ltd. and sold under the trademark designation of "Aron S-1601") in such an amount as to give a dry coating film thickness of 15 µm.

The near infrared absorbing film which had undergone the treatment for impartation of adhesiveness was pasted on the viscous surface thereof to a reinforced glass substrate 3 mm in thickness with a roll laminater. This test specimen was tested for initial optical properties and for optical properties after a test for durability. The results are shown collectively in Table 24.

Example 24

An experiment was performed by following the procedure of Example 23 while changing the composition ratio of dyes to 0.1 part by weight of the phthalocyanine [CuPc(2,5-Cl$_2$PhO)$_8${2,6-(CH$_3$)$_2$PhO}$_4$(PhCH$_2$NH)$_4$] (λmax 807 nm), 0.13 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm) obtained in Example 7 reported in the official gazette of JP-A-2001-106689, 0.07 part by weight of the phthalocyanine [VOPc(PhS)$_8${2,6-(CH$_3$)$_2$PhO}$_4$(PhCH$_2$NH)$_4$] (λmax 912 nm) obtained in Example 9, 0.02 part by weight of the phthalocyanine [VOPc(PhS)$_8${2,6-(CH$_3$)$_2$PhO}$_4${CH$_3$CH$_2$O(CH$_2$)$_3$NH}$_4$1] (λmax 928 nm) obtained in Example 8 reported in the official gazette of JP-A-2002-171738, and 0.15 part by weight of the phthalocyanine [VOPc{4-(CH$_3$O)PhS}$_8${2,6-(CH$_3$)$_2$PhO}$_4${CH$_3$(CH$_2$)$_3$CH (C$_2$H$_5$)CH$_2$NH}$_4$] (λmax 962 nm) obtained in Example 17 reported in the official gazette of JP-A-2002-171738. The results are shown collectively in Table 24.

Example 25

An experiment was performed by following the procedure of Example 23 while changing the composition ratio of dyes to 0.09 part by weight of the phthalocyanine [CuPc(2,5-Cl$_2$PhO)$_8${2,6-(CH$_3$)$_2$PhO}$_4$(PhCH$_2$NH)$_4$] (λmax 807 nm), 0.11 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm), 0.08 part by weight of the phthalocyanine [VOPc(PhS)$_8${2,6-(CH$_3$)$_2$PhO}$_4$(PhCH$_2$NH)$_4$] (λmax 912 nm), 0.09 part by weight of the phthalocyanine [VOPc{4-(CH$_3$O)PhS}$_8${2, 6-(CH$_3$)$_2$PhO}$_4${CH$_3$(CH$_2$)$_3$CH(C$_2$H$_5$)CH$_2$NH}$_4$] (λmax 962 nm), and 0.07 part by weight of diimonium type compound [N,N,N',N'-tetrakis(p-diethylaminophenyl)-p-benzoquinone-bis(imonium) hexafluoroantimonic acid salt]. The results are shown collectively in Table 24.

Example 26

An experiment was performed by following the procedure of Example 23 while changing the composition ratio of dyes to 0.1 part by weight of the phthalocyanine [CuPc(2,5-Cl$_2$PhO)$_8${2,6-(CH$_3$)$_2$PhO}$_4$(PhCH$_2$NH)$_4$] (λmax 807 nm), 0.12 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm), 0.09 part by weight of the phthalocyanine [VOPc(PhS)$_8${2,6-(CH$_3$)$_2$PhO}$_4$(PhCH$_2$NH)$_4$] (λmax 912 nm), 0.1 part by weight of the phthalocyanine [VOPc{4-(CH$_3$O)PhS}$_8${2, 6-(CH$_3$)$_2$PhO}$_4${CH$_3$(CH$_2$)$_3$CH(C$_2$H$_5$)CH$_2$Nh}$_4$] (λmax 962 nm), and 0.03 part by weight of a diimonium type compound [N,N,N',N'-tetrakis(p-diethylaminophenyl)-p-benzoquinone-bis(imonium).hexafluoroantimonic acid salt]. The results are shown collectively in Table 24.

Example 27

An experiment was performed by following the procedure of Example 23 while changing the composition ratio of dyes to 0.1 part by weight of the phthalocyanine [CuPc(2,5-Cl$_2$PhO)$_8${2,6-(CH$_3$)$_2$PhO}$_4$(PhCH$_2$NH)$_4$] (λmax 807 nm), 0.11 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm), 7, 0.08 part by weight of the phthalocyanine [VOPc(PhS)$_8${2,6-(CH$_3$)$_2$PhO}$_4$(PhCH$_2$NH)$_4$] (λmax 912 nm), 0.12 part by weight of the phthalocyanine [VOPc{4-(CH$_2$O)PhS}$_8${2,6-(CH$_3$)$_2$PhO}$_4${CH$_3$(CH$_2$)$_3$CH(C$_2$H$_5$)CH$_2$NH}$_4$] (λmax 962 nm), and 0.03 part by weight of a diimonium type compound [N,N,N',N'-tetrakis(p-diethylaminophenyl)-p-benzoquinone-bis(imonium).hexafluoroantimonic acid salt]. The results are shown collectively in Table 24.

Comparative Example 1

An experiment was performed by following the procedure of Example 23 while changing a composition ratio of dyes to 0.1 part by weight of the phthalocyanine [CuPc(2,5-Cl$_2$PhO)$_8${2,6-(CH$_3$)$_2$PhO}$_4$(PhCH$_2$NH)$_4$] (λmax 807 nm), 0.13 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm), and 0.09 part by weight of the phhthalocyanine [VOPc(PhS)$_8${2,6-(CH$_3$)$_2$PhO}$_4$(PhCH$_2$NH)$_4$] (λmax 920 nm) and using 0.07 part by weight of diimonium type compound [N,N,N',N'-tetrakis(p-diethylaminophenyl)-p-benzo-quinone-bis(imonium).hexafluoroantimonic acid salt] in place of 0.15 part by weight of the phhthalocyanine compound, [VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$] (λmax 962 nm). The results are shown collectively in Table 24.

Comparative Example 2

An experiment was performed by following the procedure of Example 23 while changing a composition ratio of dyes to 0.1 part by weight of the phthalocyanine [CuPc(2,5-Cl$_2$PhO)$_8${2,6-(CH$_3$)$_2$PhO}$_4$(PhCH$_2$NH)$_4$] (max 807 nm), 0.13 part by weight of the phthalocyanine [VOPc(2,5-C$_{12}$PhO)$_8${2,6-(CH$_3$)$_2$PhO}$_4$(PhCH$_2$—NH)$_4$] (λmax 870 nm), and 0.09 part by weight of the phthalocyanine [VOPc(PhS)$_8${2,6-(CH$_3$)$_2$PhO}$_4$(PhCH$_2$NH)$_4$] (λmax 912 nm) and omitting the use of the phthalocyanine [VOPc{4-(CH$_3$O)PhS}$_8${2,6-(CH$_3$)$_2$PhO}$_4${CH$_3$(CH$_2$)$_3$CH(C$_2$H$_5$)CH$_2$NH}$_4$] (λmax 962 nm). The results are shown collectively in Table 24.

TABLE 24

| | Visible light Average trans-mittance T (%) | Transmittance | | | | Mois-ture proof-ness | Heat resis-tance | Light resis-tance |
|---|---|---|---|---|---|---|---|---|
| | | 830 nm (%) | 880 nm (%) | 920 nm (%) | 980 nm (%) | | | |
| Example 23 | 57 | 4 | 5 | 3 | 5 | ⊙ | ⊙ | ⊙ |
| Example 24 | 58 | 4 | 6 | 3 | 4 | ⊙ | ⊙ | ⊙ |
| Example 25 | 62 | 6 | 6 | 2 | 3 | ○ | ○ | ○ |
| Example 26 | 61 | 5 | 5 | 3 | 8 | ○ | ○ | ○ |
| Example 27 | 59 | 4 | 5 | 3 | 6 | ○ | ○ | ○ |
| Comparative Example 1 | 67 | 15 | 10 | 9 | 25 | X | X | X |
| Comparative Example 2 | 68 | 15 | 14 | 15 | 50 | — | — | — |

From the foregoing results of rating, it is clear that the near infrared absorbing filters of Examples 23–26 showed repressed transmittances in the near infrared range and manifested high performance.

In contrast, the filter of Comparative Example 1 showed sharp changes after the tests for moisture-proofness, heat resistance, and light resistance particularly at a wavelength of 980 nm, i.e., that in the wavelength area of diimonium dye and posed a serious problem in the durability of diimonium dye.

Then, the near infrared absorbing filter of Comparative Example 2 allowed transmission of as much as 50% of the light particularly at a wavelength of 980 nm and manifested inferior performance.

The filters of Examples 23–27 were each mounted actually on the front surface part of a plasma display and equipped with an electronic device for remote control of the plasma display disposed at a position of 2.5 m from the display. Then, the plasma displays were tested to determine whether or not the display induced a malfunction, to find that the plasma display induced a malfunction in the absence of the filter and showed absolutely no sign of induction of a malfunction in the presence of the filter.

Example 28

As illustrated in FIG. 1, a temperature measuring device 6 was constructed by disposing support posts 3 perpendicularly (in the direction of incidence of the direct sunlight) to a support base 2 adjusted to form a substantially right angle relative to direct sunlight 1, setting a measuring filter 4 at the leading ends of the support posts 3, and disposing a sample supporting plate 5 adjustable in the vertical direction in the proximity to the lower parts of the support posts 3 (such that the device was prevented from accumulating heat by the use of a panel for the measurement which was pervious to a current of air). A black panel 7 was set on the sample supporting plate 5, with a distance of 200 mm interposed between the surface of the black panel 7 and the lower side of the measuring filter 4, and a temperature sensor 8 was contacted with the surface of the black panel 7. This temperature sensor 8 was connected via a conductor wire 9 to a measuring device (not shown). By using this temperature measuring device 6, parts exposed to the beams of direct sunlight passing through the filter of Example 21 were measured for temperature. The filters were subjected to 100 hours' light resistance test under the conditions of 50% of humidity, 63° C. of black panel temperature, and 90 mW/cm$^2$ of intensity of ultraviolet light. The results are shown in Table 25 below.

Comparative Example 3

A polycarbonate sheet of 2.5 mm in thickness was obtained by molding a fused polycarbonate resin (made by Teijin Chemical Co., Ltd. and sold under the trademark designation of "Panlite 1285") with a T-die extruding device at 280° C. The produced sheet was tested for the temperature and light resistance in the same manner as in Example 28. The results are shown in Table 25 below.

TABLE 25

| | Temperature of black panel (° C.) | Transmittance to visible ray (%) | Light resistance (ΔE) |
|---|---|---|---|
| Example 28 | 31 | 69.3 | 0.2 |
| Comparative Example 3 | 44 | 96 | 0.4 |

It is clear from Table 25 that the filter containing the phthalocyanine compound of this invention obtained in Example 28 could selectively absorb the infrared radiation in a wavelength range exceeding 920 nm and falling short of 1050 nm as compared with the filter of Comparative Example 3 and showed a high transmittance to visible light as well, namely that it could efficiently absorb and shield the wavelength in the near infrared range without interfering with the transmission of the visible radiation. It is further clear from the results of the measurement of the black panel temperature that the filter containing the phthalocyanine compound of this invention obtained in Example 28 could repress the rise of the temperature deeply and, therefore, could efficiently absorb and shield heat ray without interfering with the transmission of visible light. From the results given above, it is concluded that the filter contemplated by this invention can selectively absorb the infrared radiation in a wavelength range exceeding 920 nm and falling short of 1050 nm and is excellent in the effect of shielding heat ray as well. The filter of this invention is shown by the data of Table 25 shows only a small change of color difference after the test for light resistance, excels in weatherability, and endures practical service fully satisfactorily.

The entire disclosure of Japanese Patent Application No. 2002-171738 filed on Jun. 12, 2002 and No. 2003-100624 filed on Apr. 3, 2003, including specification, claims, drawings and summary are incorporated herein by reference in its entirety.

The invention claimed is:

1. A phthalocyanine compound (1) represented by the following formula (1):

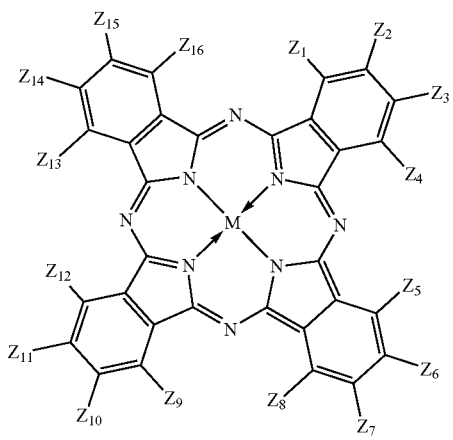

wherein
$Z_2$, $Z_3$, $Z_6$, $Z_7$, $Z_{10}$, $Z_{11}$, $Z_{14}$, and $Z_{15}$ independently stand for $SR^1$, $SR^2$, $OR^3$ or a halogen atom and at least one of them stands for $SR^2$,
$Z_1$, $Z_4$, $Z_5$, $Z_8$, $Z_9$, $Z_{12}$, $Z_{13}$, and $Z_{16}$ independently stand for $NHR^4$, $NHR^5$, $SR^1$, $SR^2$, $OR^3$, or a halogen atom and at least one of them stands for $NHR^5$ and at least four of them stand for $OR^3$,
$R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, $R^3$ and $R^4$ independently stand for a phenyl group optionally having a substituent, an aralkyl group optionally having a substituent, or an alkyl group of 1–20 carbon atoms optionally having a substituent, $R^5$ stands for an alkyl group of 1–20 carbon atoms optionally having a substituent, pluralities respectively of $R^1$, $R^2$, $R^3$, $R^4$, and $R^5$ may be individually identical or different, and M stands for a nonmetal, a metal, a metal oxide, or a metal halide.

2. A phthalocyanine compound according to claim 1, wherein when a solution contains the phthalocyanine compound at a concentration such that the lowest value of the transmittance at a wavelength exceeding 920 nm but not exceeding 1050 nm falls in the range of 5–6%, the solution exhibits transmittance of visible light of not less than 65% in the determination of a transmission spectrum.

3. A heat ray shielding material comprising a phthalocyanine compound (1) set forth in claim 1 and a resin and incorporating said phthalocyanine compound (1) in a proportion in the range of 0.0005–20 parts by weight, based on 100 parts by weight of said resin.

4. A near infrared absorbing filter comprising a phthalocyanine compound (1) set forth in claim 1 and a resin and incorporating said phthalocyanine compound (1) in a proportion in the range of 0.0005–20 parts by weight, based on 100 parts by weight of said resin.

5. A near infrared absorbing filter, characterized by using as a near infrared absorbing dye a phthalocyanine compound (1) set forth in claim 1 and a phthalocyanine compound (2) having a maximum absorption wavelength at least between 800 and 920 nm.

6. A near infrared absorbing filter according to claim 5, wherein two kinds of phthalocyanine compounds having maximum absorption wavelengths exceeding 920 nm and falling short of 950 nm and falling between 950–1000 nm as said phthalocyanine compound (1).

7. A near infrared absorbing filter according to claim 5, wherein two kinds of phthalocyanine compounds having maximum absorption wavelengths falling between 800–850 nm and between 850–920 nm as said phthalocyanine compound (2).

8. A front panel of plasma display, using a near infrared absorbing filter set forth in claim 4.

9. A plasma display using a front panel of plasma display set forth in claim 8.

10. A near infrared absorbing material comprising a phthalocyanine compound (1) set forth in claim 1 and a resin and incorporating said phthalocyanine compound (1) in a proportion in the range of 0.0005–20 parts by weight, based on 100 parts by weight of said resin.

11. A method for the production of a phthalocyanine compound set forth in claim 1, which method comprises subjecting a phthalonitrile compound represented by the following formula (3):

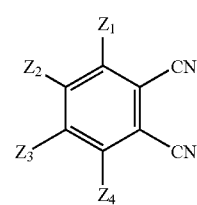

to a reaction of cyclization with one member selected from the group consisting of metal oxides, metal carbonyls, metal halides, and organic acid metals and causing the resultant product of said reaction to react with an amino compound represented by $NH_2R^4$, and amino compound represented by $NH_2R^5$, or a mixture thereof;
wherein
$Z_2$ and $Z_3$ independently stand for $SR^1$, $SR^2$, $OR^3$, or a halogen atom, and at least one of them stands for $SR^2$,
$Z_1$ and $Z_4$ independently stand for $SR^1$, $SR^2$, $OR^3$, or a halogen atom and any one of them stands for $SR^1$ or a halogen atom and the other thereof stands for $OR^3$,
$R^1$ stands for a phenyl group optionally having a substituent, an aralkyl group optionally having a substituent, or an alkyl group of 1–20 carbon atoms optionally having a substituent, $R^2$ stands for a phenyl group optionally possessing an alkoxyl group of 1–20 carbon atoms, and $R^3$ stands for a phenyl group optionally having a substituent, an aralkyl group optionally having a substituent, or an alkyl group of 1–20 carbon atoms optionally having a substituent $R^4$ stands for a phenyl group optionally possessing a substituent, an aralkyl group optionally having a substituent, or an alkyl group of 1–20 carbon atoms optionally having a substituent and $R^5$ stands for an alkyl group of 1–20 carbon atoms optionally having a substituent.

12. A method according to claim 11, further comprising reacting a phthalonitrile compound represented by the following formula (4):

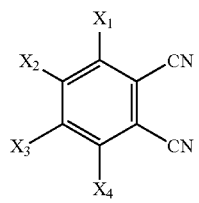

(4)

with one or more members selected from the group consisting of $HSR^1$, $HSR^2$, and $HOR^3$, to form said phthalonitrile compound of formula (3);

wherein $X_1$, $X_2$, $X_3$, and $X_4$ independently stand for a halogen atom, $R^1$ stands for a phenyl group optionally having a substituent, an aralkyl group optionally having a substituent, or an alkyl group of 1–20 carbon atoms optionally possessing a substituent, $R^2$ stands for a phenyl group optionally possessing an alkoxyl group of 1–20 carbon atoms, and $R^3$ stands for a phenyl group optionally having a substituent, an aralkyl group optionally having a substituent, or an alkyl group of 1–20 carbon atoms optionally having a substituent.

* * * * *